United States Patent
Godard et al.

(10) Patent No.: US 10,802,987 B2
(45) Date of Patent: Oct. 13, 2020

(54) COMPUTER PROCESSOR EMPLOYING CACHE MEMORY STORING BACKLESS CACHE LINES

(71) Applicant: Mill Computing, Inc., Palo Alto, CA (US)

(72) Inventors: Roger Rawson Godard, East Palo Alto, CA (US); Arthur David Kahlich, Sunnyvale, CA (US)

(73) Assignee: Mill Computing, Inc., Palo Alto, CA (US)

( * ) Notice: Subject to any disclaimer, the term of this patent is extended or adjusted under 35 U.S.C. 154(b) by 855 days.

(21) Appl. No.: 14/515,058

(22) Filed: Oct. 15, 2014

(65) Prior Publication Data

US 2015/0106545 A1 Apr. 16, 2015

Related U.S. Application Data

(60) Provisional application No. 61/890,891, filed on Oct. 15, 2013.

(51) Int. Cl.
*G06F 12/00* (2006.01)
*G06F 12/1045* (2016.01)
(Continued)

(52) U.S. Cl.
CPC ...... *G06F 12/1045* (2013.01); *G06F 12/0292* (2013.01); *G06F 12/0811* (2013.01); *G06F 12/0864* (2013.01); *G06F 12/0893* (2013.01); *G06F 12/1027* (2013.01); *G06F 12/121* (2013.01); *G06F 12/0897* (2013.01); *G06F 12/1009* (2013.01); *G06F 16/20* (2019.01); *G06F 2212/1024* (2013.01); *G06F 2212/1028* (2013.01); *G06F 2212/283* (2013.01); *G06F 2212/608* (2013.01); *G06F 2212/6032* (2013.04); *G06F 2212/684* (2013.01); *Y02D 10/13* (2018.01)

(58) Field of Classification Search
None
See application file for complete search history.

(56) References Cited

U.S. PATENT DOCUMENTS

| 5,088,026 A * | 2/1992 | Bozman | G06F 12/1063 711/112 |
| 5,761,722 A * | 6/1998 | Vishin | G06F 12/1063 711/118 |

(Continued)

FOREIGN PATENT DOCUMENTS

WO   WO 95/29446 A1   11/1995

OTHER PUBLICATIONS

Google groups post by Paul Clayton, dated Sep. 28, 2010 at https://groups.google.com/forum/#!original/comp.arch/u7z9E-zvoPo/fmGM4_lh7ywJ.

(Continued)

*Primary Examiner* — Reginald G Bragdon
*Assistant Examiner* — Michael L Westbrook
(74) *Attorney, Agent, or Firm* — Gordon & Jacobson, P.C.

(57) ABSTRACT

A computer processing system with a hierarchical memory system having at least one cache and physical memory, and a processor having execution logic that generates memory requests that are supplied to the hierarchical memory system. The at least one cache stores a plurality of cache lines including at least one backless cache line.

25 Claims, 11 Drawing Sheets

(51) Int. Cl.
  *G06F 12/1027* (2016.01)
  *G06F 12/121* (2016.01)
  *G06F 12/0893* (2016.01)
  *G06F 12/0811* (2016.01)
  *G06F 12/0864* (2016.01)
  *G06F 12/02* (2006.01)
  *G06F 12/1009* (2016.01)
  *G06F 16/20* (2019.01)
  *G06F 12/0897* (2016.01)

(56) References Cited

U.S. PATENT DOCUMENTS

| | | | |
|---|---|---|---|
| 6,832,295 | B1 | 12/2004 | Stonecypher |
| 7,171,540 | B1* | 1/2007 | Seidl ............... G06F 12/0897 |
| | | | 707/999.003 |
| 2005/0172098 | A1 | 8/2005 | Worley |
| 2005/0198464 | A1 | 9/2005 | Sokolov |
| 2007/0180215 | A1* | 8/2007 | Cascaval ............... G06F 12/10 |
| | | | 711/202 |
| 2008/0104362 | A1* | 5/2008 | Buros ............... G06F 12/1054 |
| | | | 711/207 |
| 2010/0250853 | A1 | 9/2010 | Krieger |
| 2011/0219208 | A1 | 9/2011 | Asaad et al. |
| 2012/0159103 | A1 | 6/2012 | Peinado et al. |
| 2015/0006823 | A1* | 1/2015 | Smith, Jr. ........... G06F 12/0891 |
| | | | 711/135 |

OTHER PUBLICATIONS

Google Group post by Paul Clayton on Feb. 1, 2013 at https://groups.google.com/forum/#!original/comp.arch/7PRGJNLt-o8/l_rhSCYT1olJ.

* cited by examiner

COMPUTER PROCESSOR EMPLOYING CACHE MEMORY STORING BACKLESS CACHE LINES

CROSS-REFERENCE TO RELATED APPLICATIONS

The present disclosure claims priority from U.S. Provisional Patent Appl. No. 61/890,891, filed on Oct. 15, 2013, entitled "Cache Support for a Computer Processor," herein incorporated by reference in its entirety.

BACKGROUND

1. Field

The present disclosure relates to computer processing systems.

2. State of the Art

A computer processor and the program which it executes needs places to put data for later reference. A computer processor will typically have many such places, each with its own trade off of capacity, speed of access, and cost. Usually these are arranged in a hierarchal manner referred to as the memory system of the computer processing system, with small, fast, costly places used for short lived small data and large, slow and cheap places used for what doesn't fit in the small, fast, costly places. The hierarchical memory system typically includes the following components arranged in order of decreasing speed of access:

register file or other form of fast operand storage;

one or more levels of cache memory (one or more levels of the cache memory can be integrated with the processor (on-chip cache) or separate from the processor (off-chip cache);

main memory (or physical memory), which is typically implemented by DRAM memory and/or NVRAM memory and/or ROM memory;

controller card memory; and on-line mass storage (typically implemented by one or more hard disk drives).

In many computer processing systems, the main memory can take several hundred cycles to access. The cache memory, which is much smaller and more expensive but with faster access as compared to the main memory, is used to keep copies of data that resides in the main memory. If a reference finds the desired data in the cache (a cache hit) it can access it in a few cycles instead of several hundred when it doesn't (a cache miss). Because a program typically has nothing else to do while waiting to access data in memory, using a cache and making sure that desired data is copied into the cache can provide significant improvements in performance.

The address space of the program can employ virtual memory, which provides for two different purposes in modern processors. One purpose, hereinafter paging, permits the totality of the address spaces used by all programs to exceed the capacity of the main memory attached to the processor. The other purpose, hereinafter address extension, permits the totality of the address spaces used by all programs to exceed the address space supported by the processor.

Paging can be used to map the virtual addresses used by the program at page granularity to physical addresses recognized by the main memory or to devices such as disk that are used as paging store. A program reference to an unmapped virtual address is treated as an error condition and reported to the program using a variety of methods, but usually resulting in program termination. The set of valid virtual addresses usable without error by a program is called its address space. The address mapping is represented by a set of mapping tables maintained by the operating system as it allocates and de-allocates memory for the various running programs. Every virtual address must be translated to the corresponding physical address before it may be used to access physical memory.

Systems with caches differ in whether cache lines store tags defined by a physical address (physical caching) or a virtual address (virtual caching). In the former, virtual addresses must be translated at least before they are used to match against the physical addressed tags of the cache; in the latter, translation occurs after cache access and is avoided if the reference is satisfied from cache.

Address extension is not needed when the space encompassed by the representation of a program address is large enough. Common representations of program address space are four bytes (32 bits) and eight bytes (64 bytes). The four-byte representation (yielding a four gigabyte address space) is easily exceeded by modern programs, so addresses (and address spaces) must be reused with different meanings by different programs and address extension must be used. Reuse of the same address by different programs is called aliasing. The computer processing system must disambiguate aliased use of addresses before they are actually used in the memory hierarchy.

In a computer processing system employing physical caching, alias disambiguation occurs prior to the caches. In a computer processing system employing virtual caching, disambiguation can occur after the caches if the caches are restricted to hold only memory from a single one of the aliased addressed spaces. Such a design requires that cache contents be discarded whenever the address space changes. However, the total space used by even thousands of very large programs will not approach the size representable in 64 bits, so aliasing need not occur and address extension is unnecessary in 64-bit machines. A computer processing system that does not use address extension permits all programs to share a single, large address space; such a design is said to use the single-address-space model.

It happens that the same hardware can be used both to disambiguate aliases and to map physical memory, and such is the common arrangement. Because alias disambiguation is typically performed prior to physical caches, using the common hardware means that page mapping occurs their too. When paging and alias disambiguation are in front of physical caches, it is also common to use the same hardware for access control, restricting the kinds of access and the addresses accessible to the program. The hardware enforced restrictions comprise the protection model of the processor and memory system. Protection must apply to cache accesses, so the protection machinery must be ahead of the caches. Hence it is common to have one set of hardware that intercepts all accesses to the memory hierarchy and applies protection restriction, alias disambiguation, and page mapping all together. Because all this must be performed for every reference to memory, and specifically must be performed before cache can be accessed, the necessary hardware is power hungry, large and on the critical path for program performance.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a computer processing system with a hierarchical memory system having at least one cache and physical memory. The hierarchical memory system is organized as virtual memory by a plurality of page table entries that represent a mapping between virtual addresses and corresponding physical addresses. A processor has execution logic that generates memory requests that are supplied to the hierarchical memory system. The at least one cache stores a plurality of cache lines including at least one backless cache line. The backless cache line can be referenced by a virtual address that is not backed by any valid physical address space of the physical memory of the of the hierarchical memory system.

The backless cache line can be referenced by a virtual address that does not correspond to any page table entry whose physical address points to valid physical address space of the physical memory of the hierarchical memory system. In this case, illegal virtual addresses can be recognized by operation of a protection lookaside buffer (PLB) as described herein. In one embodiment suitable for virtual caches, the backless cache line can be referenced by a virtual address that does not have a corresponding page table entry. In another embodiment suitable for physical caches, the backless cache line can be referenced by a virtual address that corresponds to a page table entry whose physical address points outside the valid physical address space of the physical memory of the hierarchical memory system.

The backless cache line can be transformed to a backed state when evicted from cache of the hierarchical memory system or when written to the physical memory of the hierarchical memory system as part of a write-through cache scheme. The page table entries can be updated to reflect the backed state of the cache line. The transformation of the backless cache line to the backed state can involve allocating physical address space of the physical memory of the hierarchical memory system for storing the backless cache line. The physical address space of the physical memory of the hierarchical memory system that is allocated to store the backless cache line can be a single-cache-line-sized page in the physical address space of the physical memory of the hierarchical memory system. The backless cache line can be stored temporarily in the single-cache-line-sized page of the physical memory of the hierarchical memory system and thereafter moved to a larger-sized page of the physical memory of the hierarchical memory system. The larger-size page can be specified by execution of an operating system on the computer processing system.

In one embodiment, the cache of the hierarchical memory system can include at least one virtual cache.

In another embodiment, the cache of the hierarchical memory system can include at least one physical cache. In this case, the backless cache line can be referenced by a virtual address that corresponds to a page table entry whose physical address points outside the valid physical address space of the physical memory of the hierarchical memory system. The page table entry corresponding to the backless cache line can include a predefined marking that identifies the backless cache line as being backless and thus not associated with a valid physical address range within the physical memory of the hierarchical memory system. The backless cache line can be transformed to a backed state when evicted from cache of the hierarchical memory system or when written to the physical memory of the hierarchical memory system as part of a write-through cache scheme. The transformation of the backless cache line to the backed state involves allocating valid physical address space of the physical memory of the hierarchical memory system for storing the backless cache line and updating the page table entries to reflect the backed state of the cache line.

A respective cache line can be initially written to a cache in the hierarchical memory system as a backless cache line until transformed to a backed state.

DETAILED DESCRIPTION OF THE PREFERRED EMBODIMENTS

Figure 1:
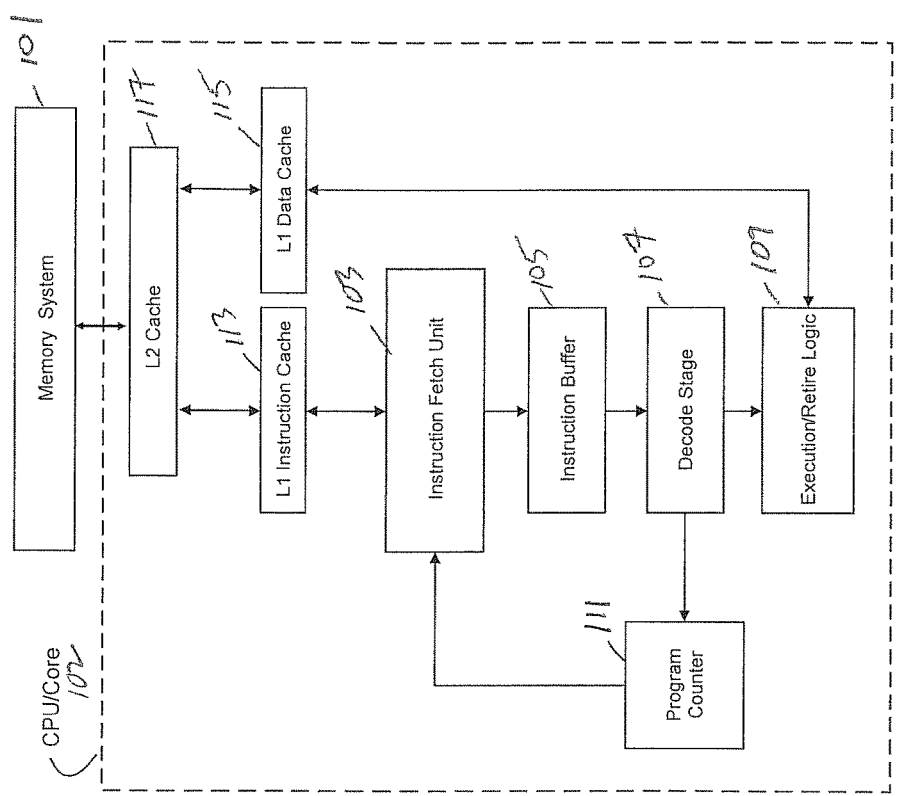
FIG. 1 is a schematic block diagram of a computer processing system according to an embodiment of the present disclosure.

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, store or branch operation.

The term "instruction" is a unit of logical encoding including zero or more operations. For the case where an instruction includes multiple operations, the multiple operations are semantically performed together.

The term "hierarchical memory system" is a computer memory system storing instructions and operand data for access by a processor in executing a program where the memory is organized in a hierarchical arrangement of levels of memory with increasing access latency from the top level of memory closest to the processor to the bottom level of memory furthest away from the processor.

The term "cache line" or "cache block" is a unit of memory that is accessed by a computer processor. The cache line includes a number of bytes (typically 4 to 128 bytes).

For computer processing systems that employ virtual memory with paging, the amount of memory in the address space of a program can change dynamically during the execution of the program. For example, in Unix systems the mmap( ) function call causes additional memory to be allocated, while the munmap( ) function call returns previously allocated memory to the operating system for other use. Many operating systems, including Unix, define that newly allocated memory may be specified to contain the value zero throughout. In addition, programs when initiated are given an initial allocation of memory, a portion of which may be defined as pre-initialized with zero. Furthermore, it is common for operating systems to defer allocation and initialization of main memory when an allocation of virtual memory is requested by the program. The mapping of the pages of the newly allocated virtual region is created and entered in page table entries that are part of a TLB and page table(s) managed by the operating system. The page table entries can be configured to provide an indication (or marking) that physical allocation of main memory has not yet been performed for a respective page of virtual memory. At first use of such a page, the marking is recognized and the operating system allocates the physical memory, initializes it, and replaces the page table entry with one indicating the allocated physical memory. Such lazy allocation optimizes the common situation in which programs request address space that they never in fact use. Virtual memory address space for which a mapping to a page of physical memory exists is said to be "backed" and thus a cache line that is located within a "backed" region or page of virtual memory is said to be a "backed" cache line or a cache line having a "backed" state. Virtual memory address space for which no such mapping to a valid page of physical memory is said to be "backless" and thus a cache line that is located within a "backless" region or page of virtual memory is said to be a "backless" cache line or cache line having a "backless" state.

Because computer processing systems that utilize physical caching must have a physical address to reference cache, all allocated virtual addresses must be backed by a page table entry, or get one on first use. In contrast, computer processing systems that utilize virtual caching do not need a physical address to reference cache, so a mapping is not necessary unless and until a reference is not satisfied from cache or a cache line is evicted from cache. Thus, it is possible to use "backless" virtual memory that has no mapping and no allocated underlying backing to a page of physical memory for certain cache lines.

In accordance with the present disclosure, a computer processing system is provided that employs virtual memory with paging where pages of physical memory are not automatically created and initialized on first use. Instead, the allocation and initialization of the pages of physical memory depends on the nature of a given memory request. Specifically, the computer processing system maintains page table entries that are configured to provide an indication (marking) that physical allocation of a corresponding page of physical memory has not yet been performed. Such indication need not be explicitly stored by the page table entries, but instead any memory request to a virtual address lacking a corresponding page table entry can be deemed to refer to a "backless" cache line that is located within a virtual address space that lacks allocation of a corresponding valid page of physical memory. Such indication is used to control the behavior of the computer processing system in allocating and initializing pages of physical memory for memory requests that access the virtual memory. Such behavior can depend on the nature of the access, whether the memory system utilizes virtual caching or physical caching, and whether the accessed cache line is present in cache (a cache hit) or not present in cache (a cache miss). Whether such information is maintained in the implicit manner as described above, or is explicitly stored in a table or other suitable data structure, may be freely chosen for the case where the memory system utilizes virtual caching.

For the case where the memory system utilizes virtual caching, a load request that hits in cache can be satisfied from the cache normally, regardless of whether the mapping provided by the page table entries of the system provides an indication that the requested cache line is "backless" or "backed." For a load request that misses in cache for a requested cache line that is "backed," the page table entry corresponding to the request cache line can be used to translate the virtual address of the requested cache line to a physical address, which is used to access physical memory to satisfy the load request normally. For a load request that misses in cache for a requested cache line that is "backless," a cache line with zero data bytes throughout can be returned as result data to the processor. A new cache line can possibly be written into cache, with the target virtual address and a zero value for all data bytes of the cache line. There is neither allocation of nor interaction with physical memory. A store request that hits in cache can update the cache normally, regardless of whether the mapping provided by the page table entries of the system provide an indication that the target cache line is "backless" or "backed." For a store request that misses in cache for a target cache line that is "backed," the page table entry corresponding to the target cache line can be used to translate the virtual address of the target cache line to a physical address, which is used to access physical memory to satisfy the store request normally. For a store request that misses in cache for a target cache line that is "backless," a new cache line can be written in the cache, with the target virtual address and a zero value for all data bytes of the target cache line. This new cache line can then be updated with the value of data byte(s) specified by the store request as if there had been no miss. There is neither allocation of nor interaction with physical memory.

The effect of these operations is that programs on machines with virtual caches can perform load and store operations without previously allocating and initializing the backing store (e.g., physical memory). All "backless" cache lines can reside in cache, and there is no operating system involvement for such load and store operations. If the program discards a page while the cache lines of the page resides only in cache, then usage of physical memory can be avoided. However, "backless" cache lines can reside in cache for only so long as the cache has capacity for them. Eventually, unless the page is deallocated first, it will be necessary for the cache to evict a backless cache line to make space available for other cache lines that must be created in or brought to cache. At that time, a physical page on the backing store can be allocated and initialized with the cache lines from cache or with zeroes for those parts of the page that have no corresponding cache line as described below. The effect of the eviction protocol is to transform the page from a "backless" to a "backed" state.

For the case where the memory system utilizes physical caching, the virtual address specified by each respective memory request can be translated to a physical address before checking cache. In this case, the physical address stored in a page table entry may refer to a page without underlying physical memory. This condition, which is referred to as a "pending" status or marking, can be stored as part of the page table entry for the corresponding page of virtual memory. In this case, the corresponding cache line(s) of the "pending" page of virtual memory is(are) "backless" as there is neither allocation of nor interaction with any meaningful and valid address space of physical memory. Note that such "pending" marking is employed in systems using physical caching. It is not used in systems with virtual caches.

With physical caching, all load and store requests utilize the page table entries of the translation lookaside buffer (TLB) and page table(s) to translate the virtual address specified by the request to a physical address. If the cache line for the request is marked as "pending" or "backed" then the physical address is present in the system's TLB or page table(s). However, if no corresponding page table entry exists (the page table is "vacant" with respect to the target cache line), then no such physical address exists.

If the cache line for the request hits in the TLB or page table, then the physical address for the cache line as provided by the matching page table entry can be used to access cache in order to satisfy the request as normally, regardless of whether the page table entry for the cache line includes a "pending" or "backed" marking.

If the cache line for the request misses in the TLB or page table and thus the TLB and page table are "vacant" with respect to a page table entry for the cache line, the computer processing system allocates a physical address for a single-line page within a "dummy" address space that does not correspond to actual address space of physical memory, creates a page table entry that associates the virtual address of the cache line with the newly allocated physical address for the single-line page, and marks the new page table entry as "pending." The load or store request then proceeds as if the "pending" page table entry had been previously inserted in the TLB and page table(s) of the system such that the newly allocated physical address for the single-line page is used to access cache, if need be.

Thus, a load request that hits in the TLB or page table can be satisfied from the cache normally, regardless of whether the page table entry for the requested cache line has a "pending" or "backed" marking. For a load request that misses in both the TLB and the page table for the requested cache line, the computer processing system allocates a physical address for a single-line page within a "dummy" address space that does not correspond to actual address space of physical memory, creates a page table entry that associates the virtual address of the requested cache line with the newly allocated physical address for the single-line page, and marks the new page table entry as "pending." A cache line with zero data bytes throughout is returned as result data to the processor. A new cache line can possibly be written into cache, with the single-line page physical address and the zero value for all data bytes of the requested cache line.

A store request that hits in the TLB or page table can be satisfied from the cache normally, regardless of whether the page table entry corresponding to the target cache line is marked as "pending" or "backed." For a store request that misses in the TLB and page table, the computer processing system allocates a physical address for a single-line page within a "dummy" address space that does not correspond to actual address space of physical memory, creates a page table entry that associates the virtual address of the target cache line with the newly allocated physical address for the single-line page, and marks the new page table entry as "pending." A new cache line can be written in the cache, with the single-line page physical address and a zero value for all data bytes of the target cache line. This new cache line can then be updated with the value of data byte(s) specified by the store request as if there had been no miss.

An eviction of a cache line corresponding to a page table entry marked as "pending" causes the computer processing system to allocate a backed physical page for the "pending" evicted cache line. The page table entry corresponding to the "pending" evicted cache line is then updated such that future references to the virtual address of the evicted cache line will reach the new physical address instead of the old "pending" address. In addition, the tags of all cache lines that are located in the page of the "pending" evicted line that now has backing can be changed to reflect the new physical address for the page corresponding to the evicted cache line.

In one embodiment, the computer processing system can employ two ways to effect the change from pending to physical address for pre-existing cache lines that become backed. In one, all such pre-existing cache lines are expelled from cache to the backing memory at the new physical address. If subsequently brought back to cache they will have the physical address rather than the pending address in cache. In another approach, the corresponding "pending" pre-existing cache lines employs tags corresponding to their "pending" addresses, and the primary page table entry(ies) corresponding to such "pending" pre-existing cache lines refer to the "pending" address. One or more new pending-to-backed secondary page table entries are s created reflecting the new allocation. Probes to cache are translated from virtual to pending addresses using the primary page table entries, while actual accesses to physical memory are translated from the "pending" address to the backed address employing the secondary page table entries. The need for the secondary address translation provided by the secondary page table entries can be detected by the memory controller because the "pending" address, while it lies within the physical address space, does not correspond to any actual memory location. The memory controller then uses the secondary page table entries to translate the unbacked "pending" address to the backed physical address for the actual access to memory. The secondary page table entries can be kept as part of the TLB and page table(s) of the computer processing system if the pending address space is numerically disjoint from the virtual address space, or can be kept in a dedicated side table.

In accordance with the present disclosure, a sequence of instructions is stored in the memory system 101 and processed by a CPU (or Core) 102 as shown in the exemplary embodiment of FIG. 1. The CPU (or Core) 102 includes a number of instruction processing stages including at least one instruction fetch unit (one shown as 103), at least one instruction buffer or queue (one shown as 105), at least one decode stage (one shown as 107) and execution/retire logic 109 that are arranged in a pipeline manner as shown. The CPU (or Core) 102 also includes at least one program counter (one shown as 111), at least one L1 instruction cache (one shown as 113), an L1 data cache 115 and a shared instruction/data L2 Cache 117.

The L1 instruction cache 113, the L1 data cache 115 and the L2 cache are logically part of the hierarchy of the memory system 101. The L1 instruction cache 113 is a cache memory that stores copies of instruction portions stored in the memory system 101 in order to reduce the latency (i.e., the average time) for accessing the instruction portions stored in the memory system 101. In order to reduce such latency, the L1 instruction cache 113 can take advantage of two types of memory localities, including temporal locality (meaning that the same instruction will often be accessed again soon) and spatial locality (meaning that the next memory access for instructions is often very close to the last memory access or recent memory accesses for instructions). The L1 instruction cache 113 can be organized as a set-associative cache structure, a fully associative cache structure, or a direct mapped cache structure as is well known in the art. Similarly, the L1 data cache 115 is a cache memory that stores copies of operands stored in the memory system 101 in order to reduce the latency (i.e., the average time) for accessing the operands stored in the memory system 101. In order to reduce such latency, the L1 data cache 115 can take advantage of two types of memory localities, including temporal locality (meaning that the same operand will often be accessed again soon) and spatial locality (meaning that the next memory access for operands is often very close to the last memory access or recent memory accesses for operands). The L1 data cache 115 can be organized as a set-associative cache structure, a fully associative cache structure, or a direct mapped cache structure as is well known in the art. The shared L2 Cache 117 stores both instructions and data. The L2 cache 117 can be organized as a set-associative cache structure, a fully associative cache structure, or a direct mapped cache structure as is well known in the art. The hierarchy of the memory system 201 can also include additional levels of cache memory, such as a level 3 cache, as well as main memory. One or more of these additional levels of the cache memory can be integrated with the CPU 202 as is well known. The details of the organization of the memory hierarchy are not particularly relevant to the present disclosure and thus are omitted from the figures of the present disclosure for sake of simplicity.

The program counter 111 stores the memory address for a particular instruction and thus indicates where the instruction processing stages are in processing the sequence of instructions. The memory address stored in the program counter 111 can be used to control the fetching of the instructions by the instruction fetch unit 103. Specifically, the program counter 111 can store the memory address for the instruction to fetch. This memory address can be derived from a predicted (or resolved) target address of a control-flow operation (branch or CALL operation), the saved address in the case of a RETURN operation, or the sum of memory address of the previous instruction and the length of previous instruction. The memory address stored in the program counter 111 can be logically partitioned into a number of high-order bits representing a cache line address ($ Cache Line) and a number of low-order bits representing a byte offset within the cache line for the instruction.

The instruction fetch unit 103, when activated, sends a request to the L1 instruction cache 113 to fetch a cache line from the L1 instruction cache 113 at a specified cache line address ($ Cache Line). This cache line address can be derived from the high-order bits of the program counter 111. The L1 instruction cache 113 services this request (possibly accessing lower levels of the memory system 101 if missed in the L1 instruction cache 113), and supplies the requested cache line to the instruction fetch unit 103. The instruction fetch unit 103 passes the cache line returned from the L1 instruction cache 113 to the instruction buffer 105 for storage therein.

The decode stage 107 is configured to decode one or more instructions stored in the instruction buffer 105. Such decoding generally involves parsing and decoding the bits of the instruction to determine the type of operation(s) encoded by the instruction and generate control signals required for execution of the operation(s) encoded by the instruction by the execution/retire logic 109.

The execution/retire logic 109 utilizes the results of the decode stage 107 to execute the operation(s) encoded by the instructions. The execution/retire logic 109 can send a load request to the L1 data cache 115 to fetch data from the L1 data cache 115 at a specified memory address. The L1 data cache 115 services this load request (possibly accessing the L2 cache 117 and lower levels of the memory system 101 if missed in the L1 data cache 115), and supplies the requested data to the execution/retire logic 109. The execution/retire logic 109 can also send a store request to the L1 data cache 115 to store data into the memory system at a specified address. The L1 data cache 115 services this store request by storing such data at the specified address (which possibly involves overwriting data stored by the data cache and lowering the stored data to the L2 Cache 117 and lower levels of the hierarchical memory system).

Figure 2:
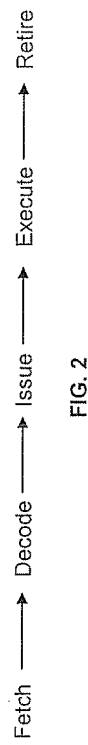
FIG. 2 is a schematic diagram of exemplary pipeline of processing stages that can be embodied by the computer processor of FIG. 1.

The instruction processing stages of the CPU (or Core) 102 can achieve high performance by processing each instruction and its associated operation(s) as a sequence of stages each being executable in parallel with the other stages. Such a technique is called "pipelining." An instruction and its associated operation(s) can be processed in five stages, namely, fetch, decode, issue, execute and retire as shown in FIG. 2.

In the fetch stage, the instruction fetch unit 103 sends a request to the L1 instruction cache 113 to fetch a cache line from the L1 instruction cache 113 at a specified cache line address ($ Cache Line). The instruction fetch unit 103 passes the cache line returned from the L1 instruction cache 113 to the instruction buffer 105 for storage therein.

The decode stage 107 decodes one or more instructions stored in the instruction buffer 107. Such decoding generally involves parsing and decoding the bits of the instruction to determine the type of operation(s) encoded by the instruction and generating control signals required for execution of the operation(s) encoded by the instruction by the execution/retire logic 109.

In the issue stage, one or more operations as decoded by the decode stage are issued to the execution logic 109 and begin execution.

In the execute stage, issued operations are executed by the functional units of the execution/retire logic 109 of the CPU/Core 102.

In the retire stage, the results of one or more operations produced by the execution/retire logic 109 are stored by the CPU/Core 102 as transient result operands for use by one or more other operations in subsequent issue/execute cycles.

The execution/retire logic 109 includes a number of functional units (FUs) which perform primitive steps such as adding two numbers, moving data from the CPU proper to and from locations outside the CPU such as the memory hierarchy, and holding operands for later use, all as are well known in the art. Also within the execution/retire logic 109 is a connection fabric or interconnect network connected to the FUs so that data produced by a producer (source) FU can be passed to a consumer (sink) FU for further storage or operations. The FUs and the interconnect network of the execution/retire logic 109 are controlled by the executing program to accomplish the program aims.

During the execution of an operation by the execution logic 109 in the execution stage, the functional units can access and/or consume transient operands that have been stored by the retire stage of the CPU/Core 102. Note that some operations take longer to finish execution than others. The duration of execution, in machine cycles, is the execution latency of an operation. Thus, the retire stage of an operation can be latency cycles after the issue stage of the operation. Note that operations that have issued but not yet completed execution and retired are "in-flight." Occasionally, the CPU/Core 102 can stall for a few cycles. Nothing issues or retires during a stall and in-flight operations remain in-flight.

Figure 3:
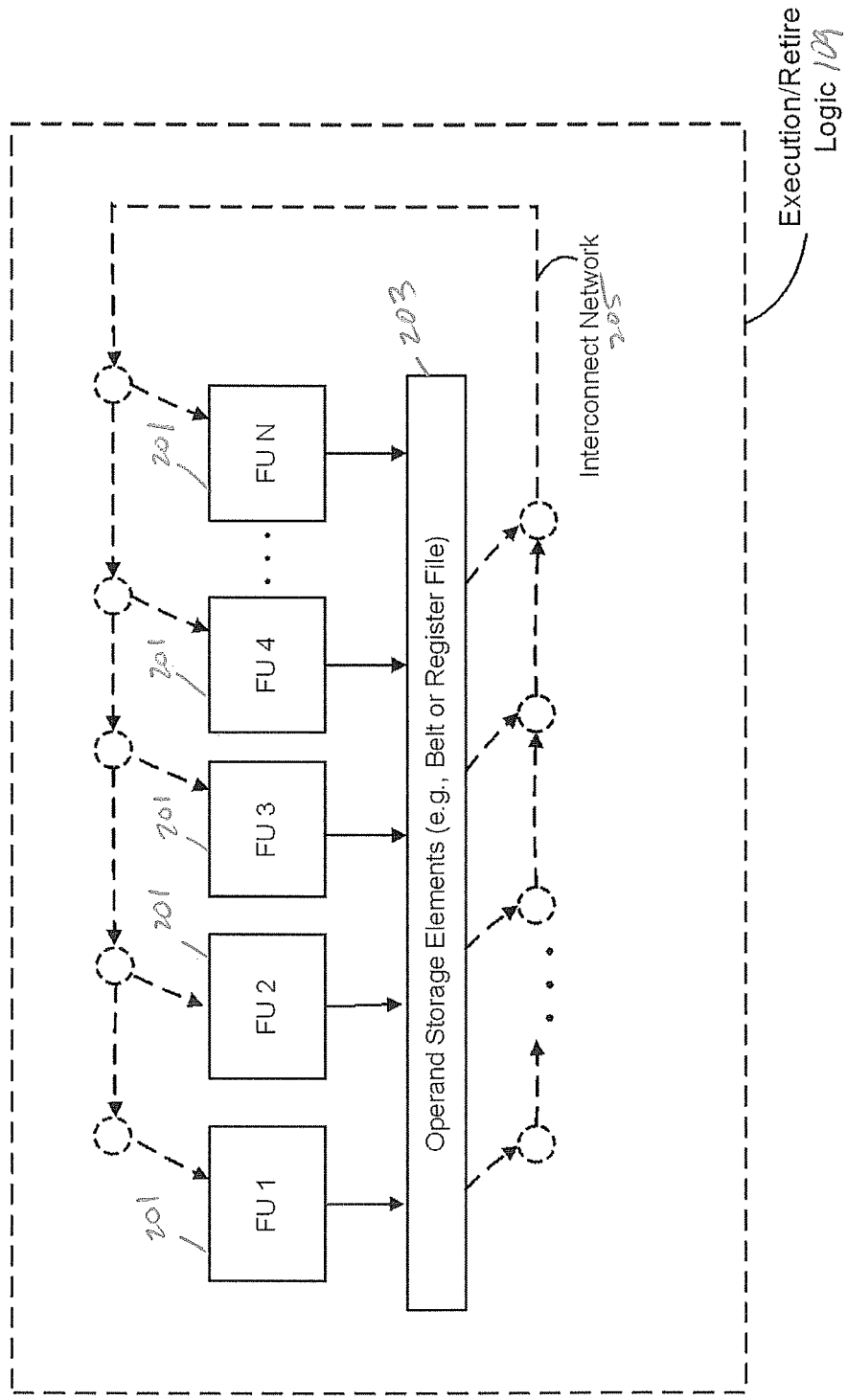
FIG. 3 is schematic illustration of components that can be part of the execution/retire logic of the computer processor of FIG. 1 according to an embodiment of the present disclosure.

FIG. 3 is a schematic diagram illustrating the architecture of an illustrative embodiment of the execution/retire logic 109 of the CPU/Core 102 of FIG. 1 according to the present disclosure, including a number of functional units 201. The execution/retire logic 109 also includes a set of operand storage elements 203 that are operably coupled to the functional units 201 of the execution/retire logic 109 and configured to store transient operands that are produced and referenced by the functional units of the execution/retire logic 109. An interconnect network 205 provides a physical data path from the operand storage elements 203 to the functional units that can possibly consume the operand stored in the operand storage elements. The interconnect network 205 can also provide the functionality of a bypass routing circuit (directly from a producer functional unit to a consumer function unit).

Figure 4:
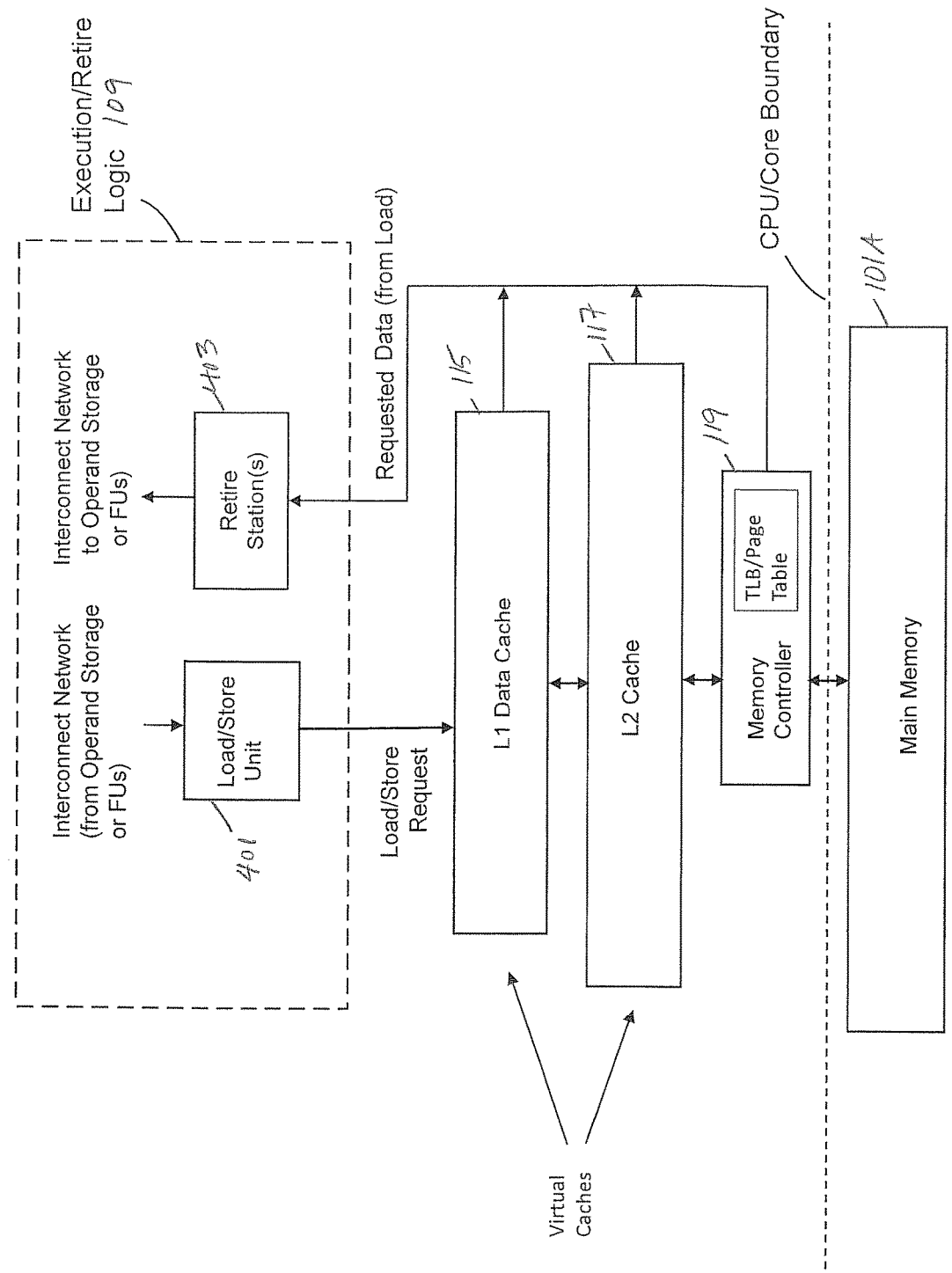
FIG. 4 is schematic illustration of components that can be part of the execution/retire logic and hierarchical memory system of the computer processor of FIG. 1 according to an embodiment of the present disclosure where the cache memory of the hierarchical memory system are virtual caches.

In one embodiment shown in FIG. 4, the memory hierarchy of the CPU/Core 102 includes several levels of cache, such as the L1 instruction cache 113 (for example, with an access time of three machine cycles), the L1 data cache 115 (for example, with an access time of three machine cycles) and the L2 instruction/data cache 117 (for example, with an access time of 10 machine cycles), as well as main memory 101A (for example, with an access time of 400 machine cycles). The caches store tags defined by virtual addresses and thus are virtual caches. The protection model of the system can be enforced by a protection lookaside buffer (PLB) that can be viewed as part of the top level cache (L1 instruction cache 113 and/or the L1 data cache 115) of the memory hierarchy. Specifically, the protection lookaside buffer provides for access control, restricting the kinds of access and the addresses accessible to the program. Such access control is enforced before program accesses to cache are allowed to complete. However, the cache access may be carried out in parallel with the protection checking, which removes protection from the program critical path. In some implementations, a separate virtual address space or memory access hardware may exist for instructions and data. In this case, the top level of cache can include distinct PLBs for each access type, an Instruction Protection Lookaside Buffer (IPLB) and a Data Translation Lookaside Buffer (DPLB). Other memory hierarchy organizations and access times can also be used. A memory controller 119 provides an interface between cache and the external main memory 101A. The memory controller 119 supports virtual memory with paging where the virtual memory is divided into equal chunks of consecutive memory locations called pages. Pages are dynamically mapped to pages of the physical memory 101A through a set of translation tables called page tables. In order to speed up virtual address translation, the memory controller 119 stores current address translations in a separate cache called the translation lookaside buffer (TLB). As noted above, for some implementations a separate virtual address space or memory access hardware may exist for instructions and data. In this case, the memory controller 119 can include distinct TLBs for each access type, an Instruction Translation Lookaside Buffer (ITLB) and a Data Translation Lookaside Buffer (DTLB). Note that because the cache of the memory hierarchy are virtual caches, the protection function provided by the PLB(s) that are part of the top level cache is split from the virtual-to-physical address mapping function provided by the TLB(s) of the memory controller 119.

The functional units of the execution/retire logic 109 includes at least one load/store unit 401 as shown. Alternatively, the functional units can include one or more dedicated load units and store units as is well known. Load operations are decoded by the decode stage 107 and issued for execution by the load/store unit 401, which issues a load request corresponding to the decoded load operation to the L1 Data Cache 115. The load request includes the virtual address for the requested cache line. Such virtual address can be provided directly from the machine code of the load operation. Alternatively, the virtual address for the load request can be provided from the operand storage (via the interconnect network 205) at a reference specified by the machine code of the load operation. Store operations are decoded by the decode stage 107 and issued for execution by the load/store unit 401, which issues a store request corresponding to the decoded store operation to the L1 Data Cache 115. The store request includes the virtual address for the target cache line. Such virtual address for the store request can be provided directly from the machine code of the store operation. Alternatively, the address for the store request can be provided from the operand storage (via the interconnect network 205) at a reference specified by the machine code of the store operation. The operand data for the store request can be provided from the operand storage (via the interconnect network 205) at a reference specified by the machine code of the store operation.

The execution/retire logic 109 also includes retire stations 403, which are hardware units that are able to buffer the result data as it arrives from the memory hierarchy. The number of retire stations 403 can vary. Each retire station 403 is capable of handling one potential in-flight load operation. A load operation contains arguments that specify a virtual memory address and possibly the width and scalarity of the desired data. Thus, a load operation may request to load a byte from virtual address 0x123456789. The load operation is decoded and issued for execution by the load/store unit 401. When executing the load operation, the load/store unit 401 allocates a retire station 403 from the available pool of retire stations. The load/store unit 401 also sends the station number of the allocated retire station with the address and width as part of a load request to the L1 data cache 115.

The L1 data cache 115 services the load request by returning all (or part) of the requested data that hits in the L1 data cache 115 to the allocated retire station 403. If the requested data is not found (misses) in L1 data cache 115, the missing part(s) of the requested data are requested from the next level in the memory hierarchy (the L2 cache 117 and then to the memory controller 119 for virtual-to-physical address translation and access to physical memory) until it is located and returned to the allocated retire station 403. The allocated retire station 403 can buffer the requested data, if need be. The retire station 403 can output the stored requested data over the interconnect network 205 for storage in the fast operand storage 203 of the execution/retire logic 109, and then clears its state, and waits to be allocated again by another load operation.

The virtual cache memory can employ a write-back scheme where data modifications (e.g., write operations) to data stored in the L1 data cache 115 are not copied immediately to main memory 101A. Instead, the write to main memory 10A can be postponed until the cache line is about to be replaced by new content. The cache memory can also employ a write-through scheme where data modifications (e.g., write operations) to data stored in the L1 data cache 115 are also written in parallel to main memory 101A.

Figure 5:
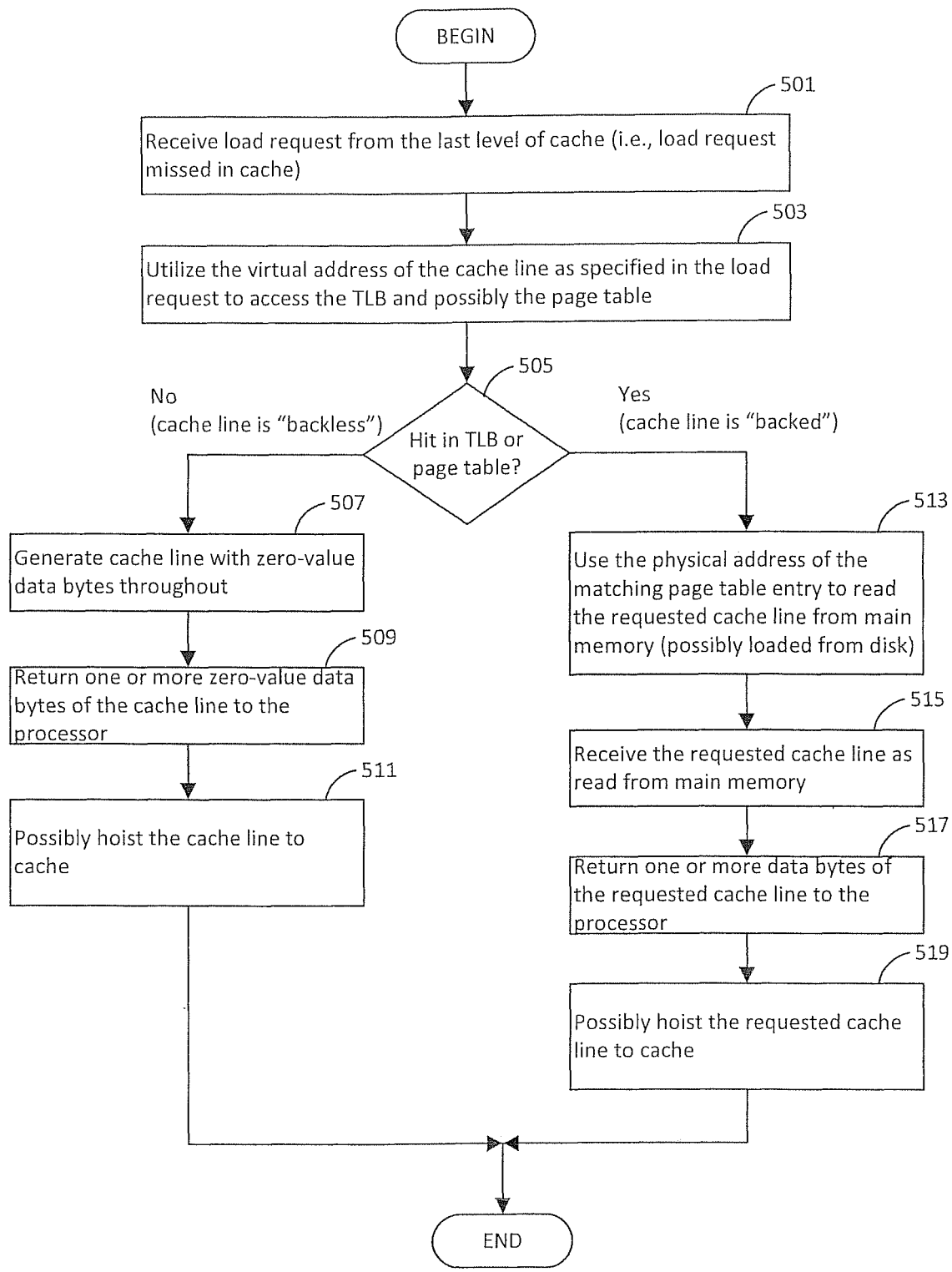
FIG. 5 is a flow chart that illustrates exemplary operations carried out by the memory controller of FIG. 4 in processing a load request where the cache memory employs a write-back scheme.

FIG. 5 is a flow chart that illustrates exemplary operations carried out by the memory controller 119 of FIG. 4 in processing a load request where the cache memory employs a write-back scheme. Note that any load request that hits in cache can be satisfied from cache normally, regardless of whether the mapping provided by the page table entries of the system provide an indication that the requested cache line is "backless" or "backed." However, any load request that misses in the cache of the system is issued from the last level of cache (e.g., the L2 cache 117 of FIG. 4) to the memory controller 119 for processing as described herein.

The operations begin in block 501 where the memory controller 119 receives a load request issued from the last level of cache (e.g., the L2 cache 117 of FIG. 4). Thus, in this case, the load request has missed in the cache of the system. The load request specifies the virtual address of the requested cache line.

In block 503, the virtual address of the requested cache line as specified in the load request received in block 501 is used to access the TLB and possibly the appropriate page table maintained by the memory controller 119 in order to determine if the TLB or the appropriate page table includes a page table entry for mapping the virtual address of the requested cache line to a physical address in block 505. If not, the requested cache line is "backless" and the operations continue to blocks 507 to 511 and then ends. In this case, illegal virtual addresses can be recognized by operation of a protection lookaside buffer (PLB) as described herein. Otherwise, the requested cache line is "backed" and the operations continue to blocks 513 to 519 and then ends.

In block 507, the memory controller 119 generates a cache line with zero-value bytes throughout.

In block 509, the memory controller 119 returns one or more zero-value bytes of the cache line generated in block 507 to the retire station 403 of the processor as result data for the requested cache line.

In block 511, the memory controller 119 can also possibly hoist the cache line generated in block 507 to the last level of cache (e.g., the L2 cache 117 of FIG. 4) and possibly to higher levels of cache such that it is written to one or more levels of the cache, if desired.

In block 513, the memory controller 119 utilizes the physical address of the matching page table entry to read the requested cache line from main memory (or possibly load it from non-volatile memory such from on-line mass storage).

In block 515, the memory controller 119 receives the requested cache line as read from main memory.

In block 517, the memory controller returns one or more bytes of the cache line as received in block 515 to the allocated retire station 403 of the processor as result data for the requested cache line.

In block 519, the memory controller 119 can also possibly hoist the corresponding cache line (the data values received in block 515 and the virtual address of the cache line) to the last level of cache (e.g., the L2 cache 117 of FIG. 4) and possibly to higher levels of cache such that it is written to one or more levels of the cache, if desired.

Note that store requests are issued by the load/store unit 401 to the L1 data cache 115, which writes the operand data as specified in the store request into the target cache line as appropriate, regardless of whether the mapping provided by the page table entries of the system provide an indication that the target cache line is "backless" or "backed."

Thus, for a load request that misses in cache for a requested cache line that is "backless," the memory controller 119 returns a cache line with zero-value data bytes throughout as a result to the processor. The memory controller 119 can also possibly write a new cache line in the cache, with the target virtual address and the zero value for all data bytes of the requested cache line. There is neither allocation of nor interaction with physical memory.

For a store request that misses in cache for a target cache line that is "backless" or "backed," a new cache line can be written in the cache, with the target virtual address and a zero value for all data bytes of the cache line. This new cache line can then be updated with the value of data byte(s) specified by the store request as if there had been no miss. There is neither allocation of nor interaction with physical memory.

Figure 6:
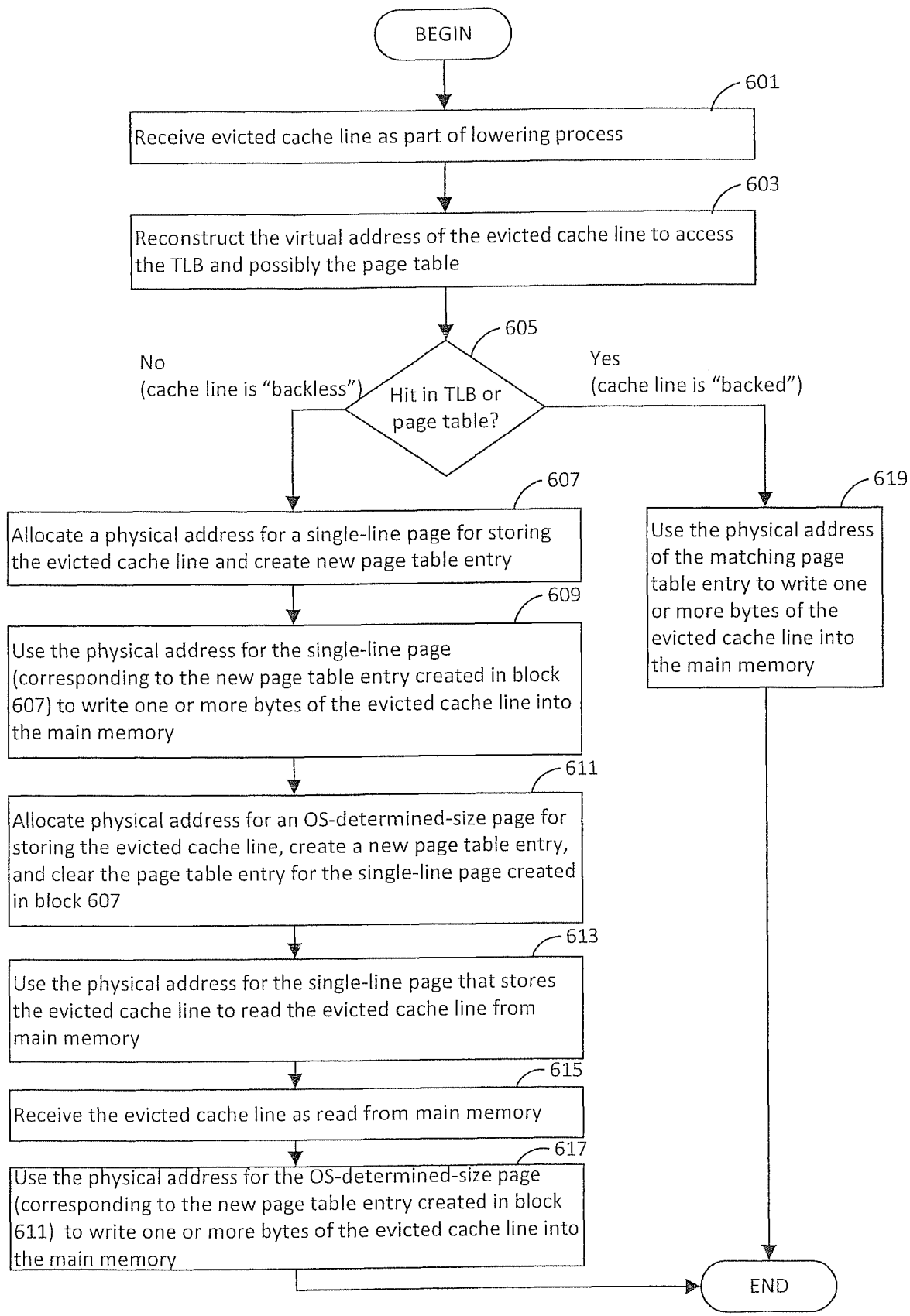
FIG. 6 is a flow chart that illustrates exemplary operations carried out by the memory controller of FIG. 4 in processing an evicted cache line as part of a lowering process where the cache memory employs a write-back scheme.

FIG. 6 is a flow chart that illustrates exemplary operations carried out by the memory controller 119 of FIG. 4 in processing an evicted cache line as part of a lowering process where the cache memory employs a write-back scheme. Specifically, when a cache line in the lowest level of cache (i.e., the shared L2 cache 117 in FIG. 4) is evicted to make room in the cache, the evicted cache line is lowered to the memory controller 119 for processing as described below.

In block 601, the operations begin where the memory controller 119 receives the evicted cache line as part of the lowering process. The virtual address of the evicted cache line accompanies (or is associated with) the data of the evicted cache line in the lowering process.

In block 603, memory controller 119 reconstruct the virtual address of the evicted cache line to access the TLB and possibly the page table in order to determine if the TLB or the appropriate page table includes a page table entry for mapping the virtual address of the evicted cache line to a physical address in block 605. If not, the evicted cache line is "backless" and the operations continue to blocks 607 to 617 and then ends. Otherwise, the evicted cache line is "backed" and the operations continue to block 619 and then ends In block 607, the memory controller 119 triggers the allocation of a physical address for a single-line page for storing the evicted cache line, and creates new page table entry for this page. It is contemplated that the memory controller 119 can cooperate with the operating system to determine the allocation of the physical address for the single-line page that will store the evicted cache line.

In block 609, the memory controller 119 utilizes the physical address for the single-line page (corresponding to the new page table entry created in block 607) to write one or more bytes of the evicted cache line into main memory 101A.

In block 611, the memory controller 119 triggers allocation of a physical address for an OS-determined-size page for storing the evicted cache line, creates a new page table entry, and clears the page table entry for the single-line page created in block 607. It is contemplated that the memory controller 119 can cooperate with the operating system to determine the page size for the evicted cache line by raising a predefined interrupt signal. The execution of the operating system can consult internal data structures to determine what the evicted line was being used for (such as the stack, heap, I/O buffer, etc.) and decide on the page size on that basis for communication back to the memory controller 119.

In block 613, the memory controller 119 can utilize the physical address for the single-line page that stores the evicted cache line to read the evicted cache line from main memory 101A.

In block 615, the memory controller 119 can receive the evicted cache line as read from main memory 101A in block 613.

In block 617, the memory controller 119 can utilize the physical address for the OS-determined-size page (corresponding to the new page table entry created in block 611) to write one or more data bytes of the evicted cache line into the main memory 101A.

In block 619, the memory controller 119 can utilize the physical address of the matching page table entry to write one or more data bytes of the evicted cache line into the main memory 101A.

Note that in the operations of blocks 607 to 617, the single-line page that stores the "backless" newly evicted cache line is transient in nature and provide a place to put the evicted cache line while the operating system is setting up a larger-sized page. Note that the single-line page is similar to larger-size pages except for its size. It has an entry in the page tables too, which means that it is backed. When a larger-sized page has been allocated and initialized, it is placed in the page table, the cache line in the one-line page is read in from physical memory and written out to its place in the new larger-sized page, and the table entry for the one-line page is cleared so that no virtual address maps to it any more. That one-line page can then queued for the hardware for the next time that an eviction of a backless cache line occurs.

In an alternative embodiment, the cache memory can employ a write-through scheme where data modifications (e.g., write operations) to data stored in the L1 data cache 115 are also written in parallel to main memory 101A. In this case, the memory controller 119 can operate to process load requests in the manner described above with respect to FIG. 5. The write-through caches need not lower evicted cache lines as the evicted lines are written to main memory when the cache is written.

Figure 7:
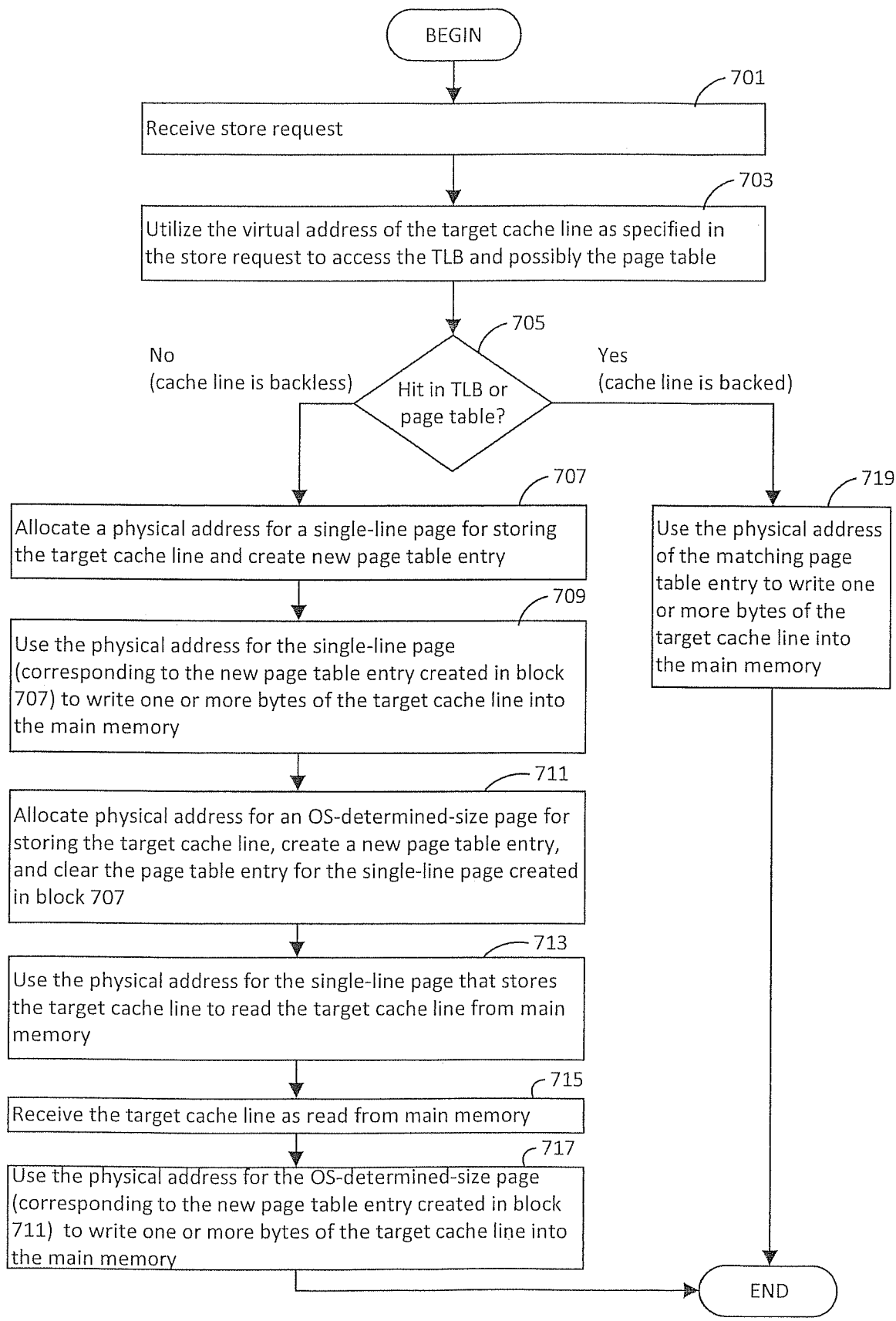
FIG. 7 is a flow chart that illustrates exemplary operations carried out by the memory controller of FIG. 4 in processing a store request where the cache memory employs a write-through scheme.

FIG. 7 is a flow chart that illustrates exemplary operations carried out by the memory controller 119 of FIG. 4 in processing a store request where the cache memory employs a write-through scheme.

In block 701, the operations begin where the memory controller 119 receives a store request issued from one level of the cache. The store request specifies the virtual address of the target cache line. In the write-through scheme, such operations are performed in parallel with writing the target cache line into cache.

In block 703, the virtual address of the target cache line as specified by the store request received in block 701 is used to access the TLB and possibly the appropriate page table maintained by the memory controller 119 in order to determine if the TLB or the appropriate page table includes a page table entry for mapping the virtual address of the target cache line to a physical address in block 705. If not, the target cache line is "backless" and the operations continue to blocks 707 to 717 and then ends. Otherwise, the target cache line is "backed" and the operations continue to block 719 and then ends.

In block 707, the memory controller 119 triggers the allocation of a physical address for a single-line page for storing the target cache line, and creates new page table entry for this page. It is contemplated that the memory controller 119 can cooperate with the operating system to determine the allocation of the physical address for the single-line page that will store the target cache line.

In block 709, the memory controller 119 utilizes the physical address for the single-line page (corresponding to the new page table entry created in block 707) to write one or more data bytes of the target cache line into the main memory 101A.

In block 711, the memory controller 119 triggers allocation of a physical address for an OS-determined-size page for storing the target cache line, creates a new page table entry, and clears the page table entry for the single-line page created in block 707. It is contemplated that the memory controller 119 can cooperate with the operating system to determine the page size for the target cache line by raising a predefined interrupt signal. The execution of the operating system can consult internal data structures to determine what the target cache line was being used for (such as the stack, heap, I/O buffer, etc.) and decide on the page size on that basis for communication back to the memory controller 119.

In block 713, the memory controller 119 can utilize the physical address for the single-line page that stores the target cache line to read the target cache line from main memory 101A.

In block 715, the memory controller 119 can receive the target cache line as read from main memory 101A in block 713.

In block 717, the memory controller 119 can utilize the physical address for the OS-determined-size page (corresponding to the new page table entry created in block 711) to write one or more data bytes of the target cache line into the main memory 101A.

In block 719, the memory controller 119 can utilize the physical address of the matching page table entry to write one or more data bytes of the target cache line into the main memory 101A.

Note that in the operations of blocks 707 to 717, the single-line page that stores the "backless" target cache line is transient in nature and provide a place to put the target cache line while the operating system is setting up a proper-sized page. Note that the single-line page is similar to larger-sized pages except for its size. It has an entry in the page tables too, which means it is "backed." When a larger-sized page has been allocated and initialized it is placed in the page table, the cache line in the one-line page is read in from physical memory and written out to its place in the new larger-sized page, and the table entry for the one-line page is cleared so no virtual address maps to it any more. That one-line page can then queued for the hardware for the next time that a store request to a backless target cache line occurs.

Figure 8:
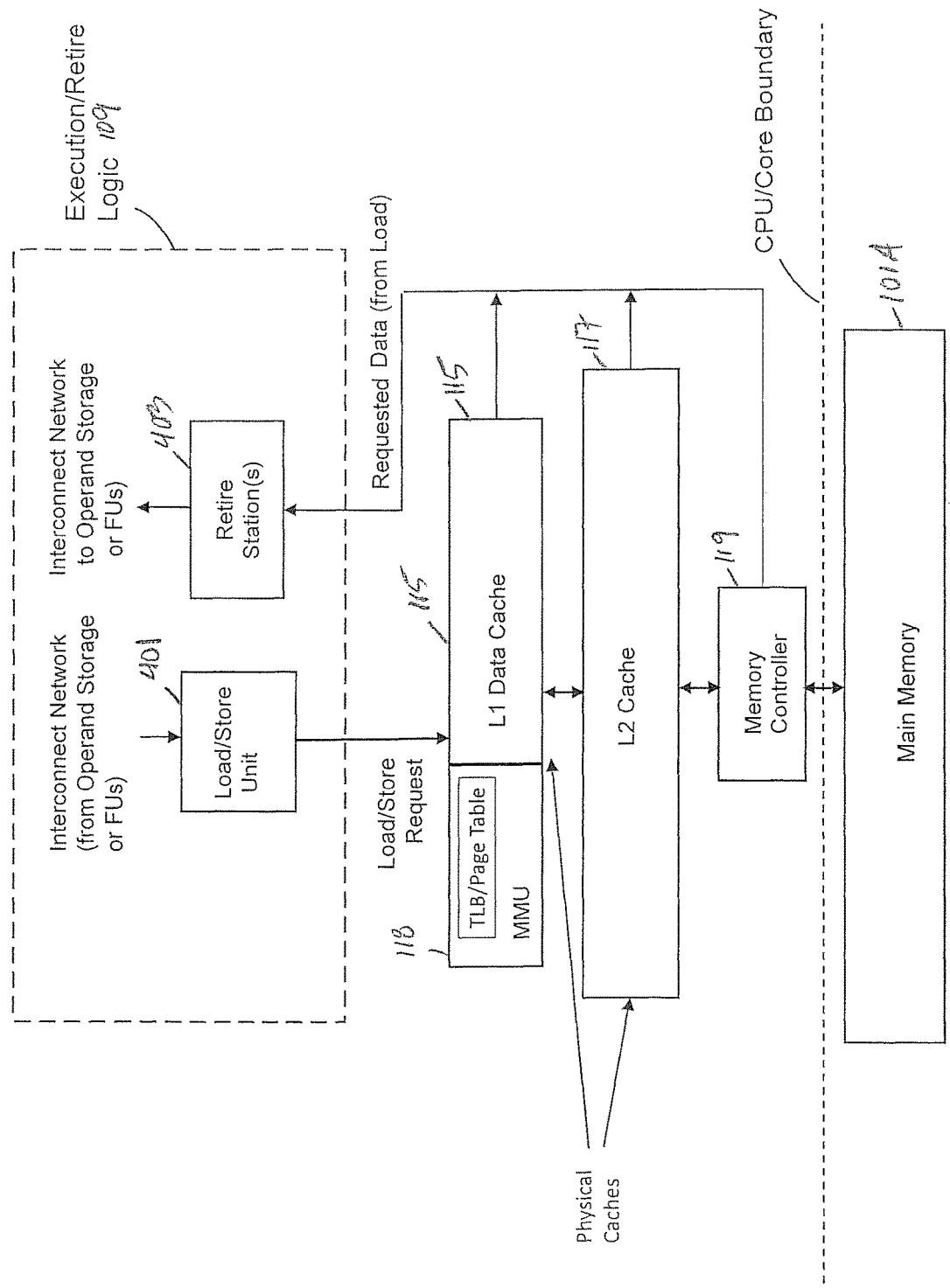
FIG. 8 is schematic illustration of components that can be part of the execution/retire logic and hierarchical memory system of the computer processor of FIG. 1 according to another embodiment of the present disclosure where the cache memory of the hierarchical memory system are physical caches.

In another embodiment shown in FIG. 8, the memory hierarchy of the CPU/Core 102 includes several levels of cache, such as the L1 instruction cache 113 (not shown) and the L1 data cache 115 (for example, with an access time of three machine cycles) and an L2 instruction/data cache 117 (for example, with an access time of 10 machine cycles), as well as main memory 101A (for example, with an access time of 400 machine cycles). The caches store tags defined by physical addresses and thus are physical caches. The top level of cache (the L1 instruction cache 113 and the L1 data cache 115) cooperates with a memory management unit (MMU) 118. A memory controller 119 provides an interface between the cache memory and the external main memory 101A. The MMU 118 and the memory controller 119 support virtual memory with paging where the virtual memory is divided into equal chunks of consecutive memory locations called pages. Pages are dynamically mapped to pages of the physical memory 101A through a set of translation tables called page tables. In order to speed up virtual address translation, the MMU 118 stores current address translations in a separate cache called the translation lookaside buffer (TLB). In some implementations, a separate virtual address space or memory access hardware may exist for instructions and data. In this case, distinct MMUS and distinct TLBs can be provided for each access type, an instruction memory management unit (IMMU) with an Instruction Translation Lookaside Buffer (ITLB) and a data memory management unit (DMMU) with a Data Translation Lookaside Buffer (DTLB). The protection model of the system can be enforced by the MMU(s). Specifically, the MMU(s) can provide for access control, restricting the kinds of access and the addresses accessible to the program. Such access control is enforced before program accesses to cache are allowed to complete. However, the cache access may be carried out in parallel with the protection checking, which removes protection from the program critical path. Other memory hierarchy organizations and access times can also be used.

The functional units of the execution/retire logic 109 includes at least one load/store unit 401 as shown. Alternatively, the functional units can include one or more dedicated load units and store units as is well known. Load operations are decoded by the decode stage 107 and issued for execution by the load/store unit 401, which issues a load request corresponding to the decoded load operation for accessing L1 data cache 115. The load request includes the virtual address for the requested cache line. Such virtual address can be provided directly from the machine code of the load operation. Alternatively, the virtual address for the load request can be provided from the operand storage (via the interconnect network 205) at a reference specified by the machine code of the load operation. The MMU 118 performs virtual-to-physical address translation with respect to the requested cache line as part of accessing the L1 data cache 115. Store operations are decoded by the decode stage 107 and issued for execution by the load/store unit 401, which issues a store request corresponding to the decoded store operation for accessing the L1 data cache 115. The store request includes the virtual address for the target cache line. Such virtual address for the store request can be provided directly from the machine code of the store operation. Alternatively, the address for the store request can be provided from the operand storage (via the interconnect network 205) at a reference specified by the machine code of the store operation. The operand data for the store request can be provided from the operand storage (via the interconnect network 205) at a reference specified by the machine code of the store operation. The MMU 118 performs virtual-to-physical address translation with respect to the target cache line as part of accessing the L1 data cache 115

The execution/retire logic 109 also includes retire stations 403, which are hardware units that are able to buffer the result data from a respective load operation as it arrives from the memory hierarchy. The number of retire stations 403 can vary. Each retire station 403 is capable of handling one potential in-flight load operation. A load operation contains arguments that specify a virtual memory address and possibly the width and scalarity of the desired data. Thus, a load operation may request to load a byte from virtual address Ox123456789. The load operation is decoded and issued for execution by the load/store unit 401. When executing the load operation, the load/store unit 401 allocates a retire station 403 from the available pool of retire stations. The load/store unit 401 also sends the station number of the allocated retire station with the address and width as part of a load request to the L1 data cache 115.

The L1 data cache 115 services each respective load request and store request by accessing the TLB and possibly the appropriate page table of the MMU 118 for virtual-to-physical address translation where the physical address derived from such translation is used to access the physical caches and possibly the physical memory in the event that the request cache line misses in the physical cache. In processing a load request, all (or part) of the requested data that hits in the L1 data cache 115 is returned to the allocated retire station 403. If the requested data is not found (misses) in L1 data cache 115, the missing part(s) of the requested data are requested from the next level in the memory hierarchy (the L2 cache 117 and then to the memory controller 119 for access to physical memory) until it is located and returned to the allocated retire station 403. The allocated retire station 403 can buffer the requested data, if need be. The retire station 403 can output the stored requested data over the interconnect network 205 for storage in the fast operand storage 203 of the execution/retire logic 109, and then clears its state, and waits to be allocated again by another load operation.

The physical cache memory can employ a write-back scheme where data modifications (e.g., write operations) to data stored in the L1 data cache 115 are not copied immediately to main memory 101A. Instead, the write to main memory 101A can be postponed until the cache line is about to be replaced by new content. The cache memory can also employ a write-through scheme where data modifications (e.g., write operations) to data stored in the L1 data cache 115 are also written in parallel to main memory 101A.

Figure 9:
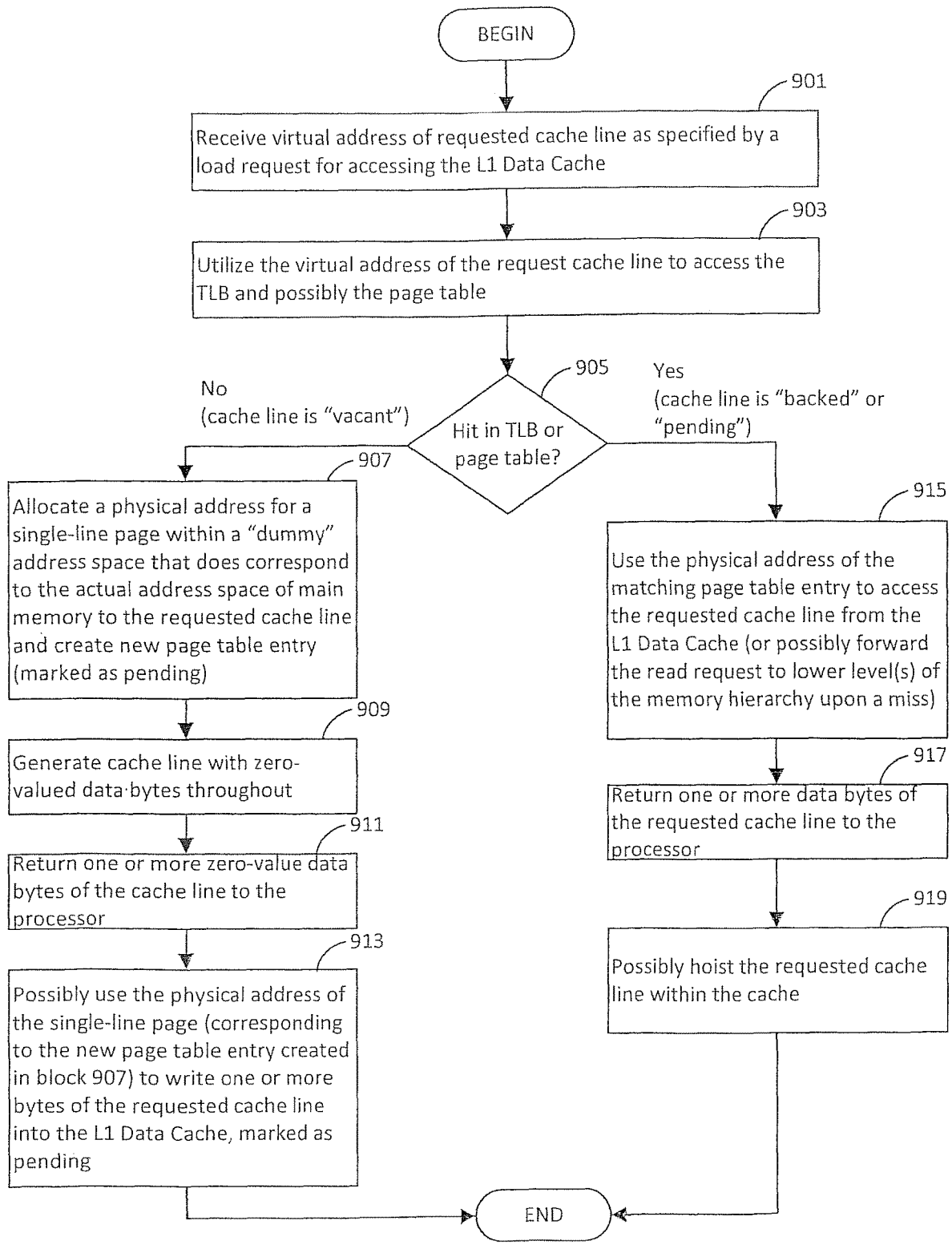
FIG. 9 is a flow chart that illustrates exemplary operations carried out by the MMU 118 and other parts of the memory hierarchy of FIG. 8 in conjunction with the processing a load request where the cache memory employs a write-back scheme.

FIG. 9 is a flow chart that illustrates exemplary operations carried out by the MMU 118 and other parts of the memory hierarchy of FIG. 8 in conjunction with the processing a load request where the cache memory employs a write-back scheme.

The operations begin in block 901 where the MMU 118 receives the virtual address of a requested cache line as specified by a load request for accessing the L1 data cache 115.

In block 903, the MMU 118 utilizes the virtual address of the requested cache line as received in block 901 to access the TLB and possibly the appropriate page table maintained by the MMU 118 in order to determine if the TLB or the appropriate page table includes a page table entry for mapping the virtual address of the requested cache line to a physical address in block 905. If not, the requested cache line is "vacant" and the operations continue to blocks 907 to 913 and then ends. Otherwise, the requested cache line is "backed" or "pending" and the operations continue to blocks 915 to 919 and then ends.

In block 907, the MMU 118 triggers allocation of a physical address for a single-line page within a "dummy" address space that does not correspond to actual address space of physical memory 101A, creates a page table entry that associates the virtual address of the target cache line with the newly allocated physical address for the single-line page, and marks the new page table entry as "pending." It is contemplated that the MMU 118 can cooperate with the operating system to determine the allocation of the "dummy" physical address for the single-line page corresponding to the requested cache line.

In block 909, the MMU 118 can generate a cache line with zero data bytes throughout.

In block 911, the MMU 118 can return the cache line generated in block 909 to the retire station 403 of the processor allocated to handle the load request.

In block 913, the MMU 118 can possibly write the new cache line into the L1 data cache 115. The new cache line utilizes "dummy" physical address for the single-line page allocated in block 907 and zero value for all data bytes of the cache line. The new cache line is also marked as "pending."

In block 915, the MMU 118 an utilize the physical address of the matching page table entry to read the requested cache line from the L1 data cache 115 (or possibly forward the read request to lower levels of the memory system upon a miss).

In block 917, the data values for the requested cache line are returned to the retire station 403 of the processor as result data for the requested cache line.

In block 919, the requested cache line can possibly be hoisted within the physical such that it is written to one or more levels of the physical cache, if desired.

Figure 10:
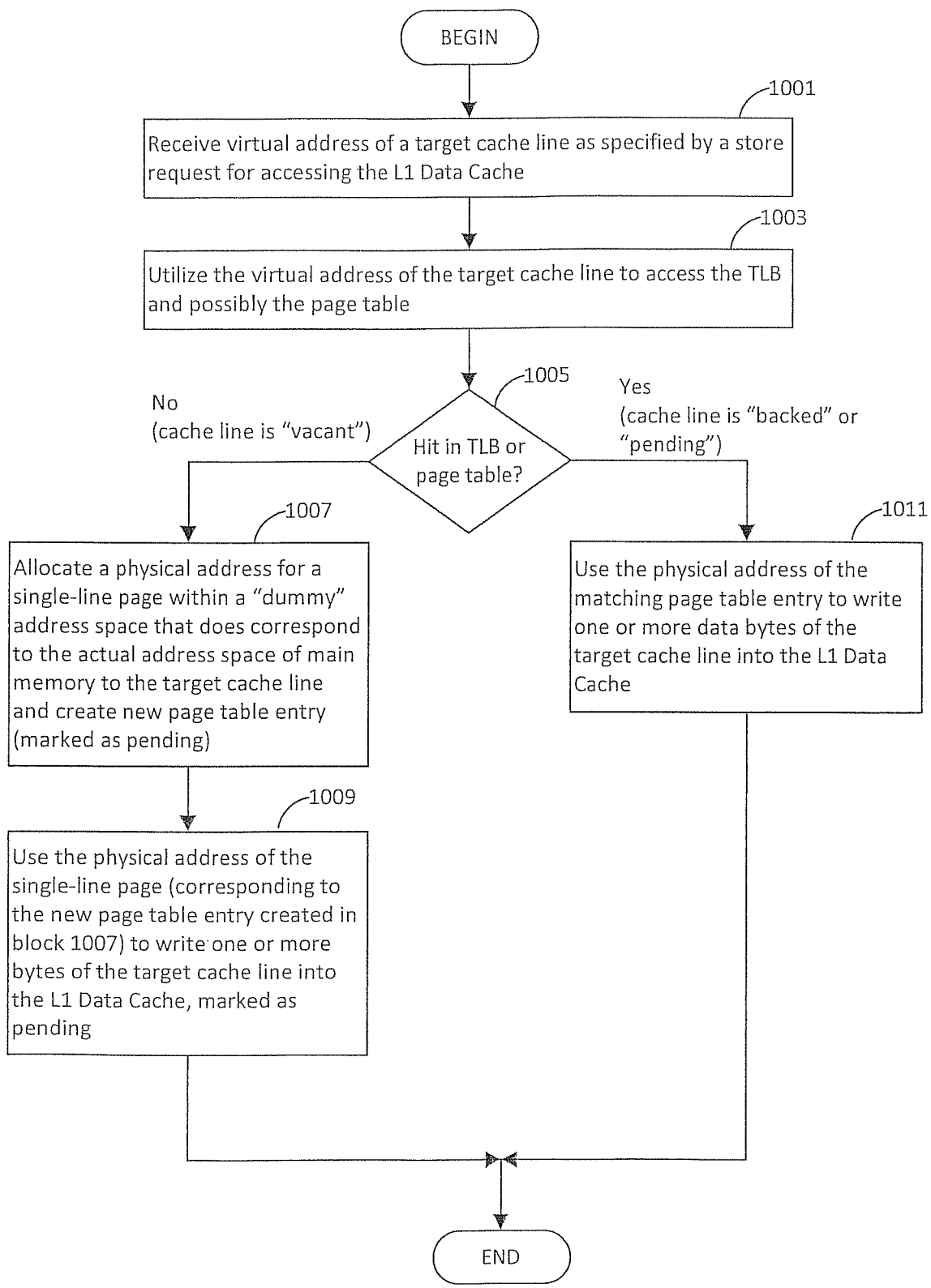
FIG. 10 is a flow chart that illustrates exemplary operations carried out by the MMU 118 and other parts of the memory hierarchy of FIG. 8 in conjunction with the processing a store request where the cache memory employs a write-back scheme.

FIG. 10 is a flow chart that illustrates exemplary operations carried out by the MMU 118 and other parts of the memory hierarchy of FIG. 8 in conjunction with the processing a store request where the cache memory employs a write-back scheme.

The operations begin in block 1001 where the MMU 118 receives the virtual address of a target cache line as specified by a store request for accessing the L1 data cache 115. The store request also specifies one or more data bytes for the target cache line.

In block 1003, the MMU 118 utilizes the virtual address of the target cache line as received in block 1001 to access the TLB and possibly the appropriate page table maintained by the MMU 118 in order to determine if the TLB or the appropriate page table includes a page table entry for mapping the virtual address of the target cache line to a physical address in block 1005. If not, the target cache line is "vacant" and the operations continue to blocks 1007 to 1009 and then ends. Otherwise, the target cache line is "backed" or "pending" and the operations continue to block 1011 and then ends.

In block 1007, the MMU 118 triggers allocation of a physical address for a single-line page within a "dummy" address space that does not correspond to actual address space of physical memory 101A, creates a page table entry that associates the virtual address of the target cache line with the newly allocated physical address for the single-line page, and marks the new page table entry as "pending." It is contemplated that the MMU 118 can cooperate with the operating system to determine the allocation of the "dummy" physical address for the single-line page corresponding to the target cache line.

In block 1009, the MMU 118 utilizes the single-line page physical address allocated in block 1007 to write one or more data bytes of the target cache line as specified in the store request into the L1 data cache 115. The cache line is also marked as "pending."

In block 1011, the physical cache system can utilize the physical address of the matching page table entry to write one or more data bytes of the target cache line as specified in the store request into the L1 data cache 115.

Figure 11:
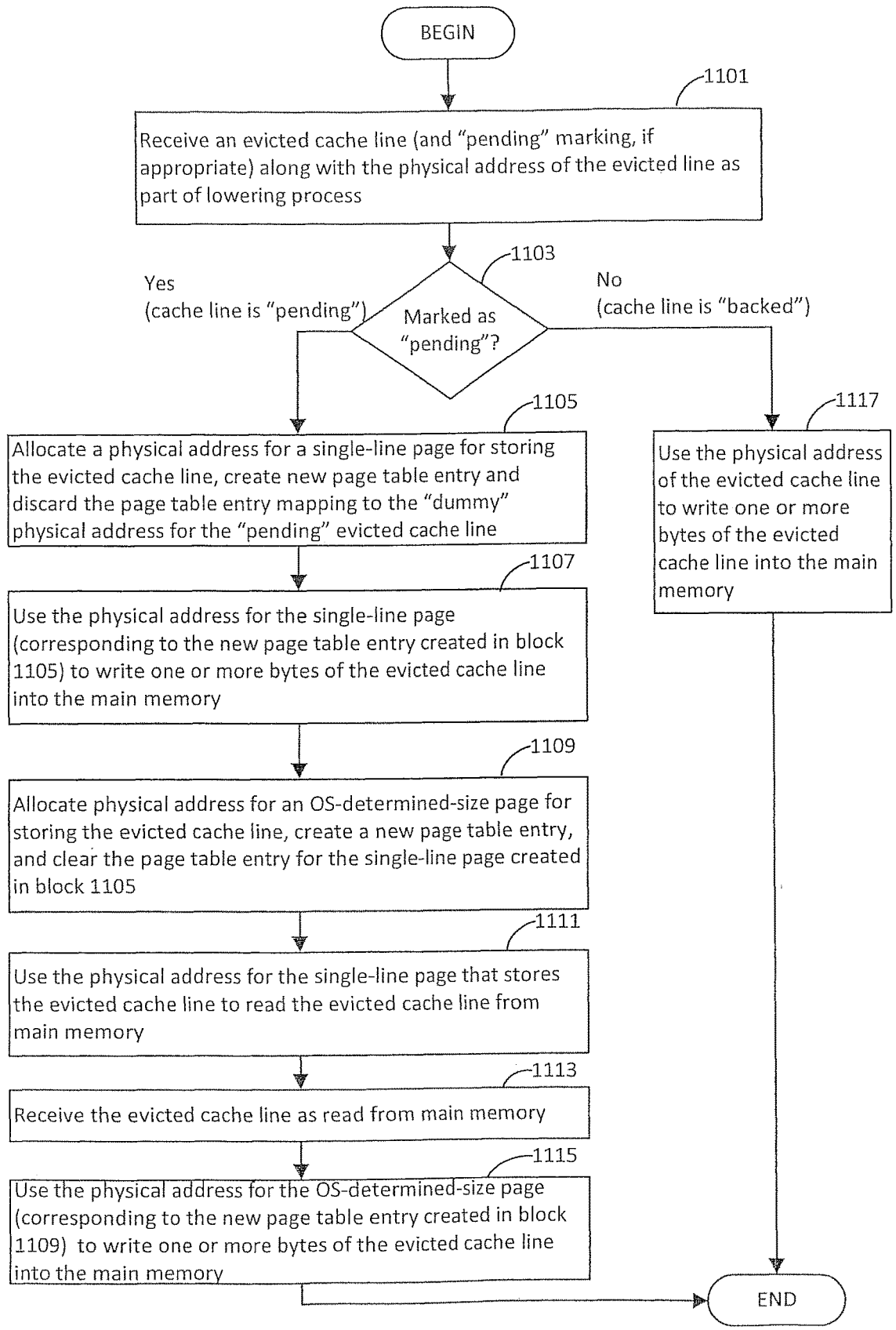
FIG. 11 is a flow chart that illustrates exemplary operations carried out by the memory controller of FIG. 8 in processing an evicted cache line as part of a lowering process where the cache memory employs a write-back scheme.

FIG. 11 is a flow chart that illustrates exemplary operations carried out by the memory controller 119 of FIG. 8 in processing an evicted cache line as part of a lowering process where the cache memory employs a write-back scheme. Specifically, when a cache line in the lowest level of cache (i.e., the shared L2 cache 117 in FIG. 8) is evicted to make room in the cache, the evicted cache line is lowered to the memory controller 119 for processing as described below.

In block 1101, the operations begin where the memory controller 119 receives the evicted cache line as part of the lowering process. The marking of the evicted cache line ("pending" or "backed") along with the physical address of the evicted cache line accompanies (or is associated with) the data of the evicted cache line in the lowering process.

In block 1103, memory controller 119 checks the marking of the evicted cache line to determine whether it is marked as "pending." If so, the evicted cache line is "pending" and the operations continue to blocks 1105 to 1115 and then ends. Otherwise, the evicted cache line is "backed" and the operations continue to block 1117 and then ends.

In block 1105, the memory controller 119 triggers the allocation of a physical address for a single-line page for storing the evicted cache line, creates new page table entry for this page, and discards the page table entry to the "dummy" physical address previously associated with evicted cache line. It is contemplated that the memory controller 119 can cooperate with the operating system to determine the allocation of the physical address for the single-line page corresponding to the evicted cache line.

In block 1107, the memory controller 119 utilizes the physical address for the single-line page (corresponding to the new page table entry created in block 1105) to write one or more bytes of the evicted cache line into the main memory 101A.

In block 1109, the memory controller 119 triggers allocation of a physical address for an OS-determined-size page for storing the evicted cache line, creates a new page table entry, and clears the page table entry for the single-line page created in block 1105. It is contemplated that the memory controller 119 can cooperate with the operating system to determine the page size for the evicted cache line by raising a predefined interrupt signal. The execution of the operating system can consult internal data structures to determine what the evicted line was being used for (such as the stack, heap, I/O buffer, etc.) and decide on the page size on that basis for communication back to the memory controller 119.

In block 1111, the memory controller 119 can utilize the physical address for the single-line page that stores the evicted cache line to read the evicted cache line from main memory 101A.

In block 1113, the memory controller 119 can receive the evicted cache line as read from main memory 101A in block 1111.

In block 1115, the memory controller 119 can utilize the physical address for the OS-determined-size page (corresponding to the new page table entry created in block 1109) to write one or more bytes of the evicted cache line into the main memory 101A.

In block 1117, the memory controller 119 can utilize the physical address of the evicted cache line to write one or more bytes of the evicted cache line into the main memory 101A.

Note that in the operations of blocks 1105 to 1115, the eviction of the cache line marked as "pending" causes the computer processing system to allocate a backed physical page with suitable mapping to the evicted cache line. The page table entry corresponding to the "pending" evicted cache line is then updated such that future references to the virtual address of the evicted cache line will reach the new backed address instead of the old "pending" address. In addition, all cache lines that are located in the pending region that now has backing can be changed to reflect the new physical address. There are two ways to effect the change from pending to physical address for pre-existing cache lines that become backed. In one, all such pre-existing cache lines are expelled from cache to the backing memory at the new physical address. If subsequently brought back to cache they will have the physical address rather than the pending address in cache. In another approach, the corresponding "pending" pre-existing cache lines are left with their "pending" addresses in cache, and the translation mapping is left referring to the pending address. A new pending-to-backed mapping is created reflecting the new allocation. Probes to cache are translated from virtual to pending addresses, while actual access to physical memory translate from the pending address to the backing address. The need for the secondary translation from pending to backed can be detected by the memory controller because the pending address, while it lies within the physical address space, does not correspond to and actual memory location. The memory controller 119 then translates the unbacked pending address to the backed address for the actual access to memory. The pending-to-physical mapping can be kept as part of the TLB and page table of the system if the pending address space is numerically disjoint from the virtual address space, or can be kept in a dedicated side table.

Also note that in the operations of blocks 1105 to 1115, the single-line physical page that stores the newly evicted cache line is transient in nature and provide a place to put the evicted cache line while the operating system is setting up a larger-sized page. Note that the single-line page is similar to the larger-sized page in that it is backed. When a larger-sized page has been allocated and initialized it is placed in the page table, the cache line in the one-line page is read in from physical memory and written out to its place in the new larger-sized page, and the table entry for the one-line page is cleared so no virtual address maps to it any more. That one-line page can then queued for the hardware for the next time that an eviction of a "pending" backless cache line is processed at the memory controller 119.

In an alternative embodiment, the cache memory can employ a write-through scheme where data modifications (e.g., write operations) to data stored in the L1 data cache 115 are also written in parallel to main memory 101A. In this case, the memory controller 119 can operate to process load requests in the manner described above with respect to FIG. 9. The write-through caches need not lower evicted cache lines as the evicted lines are written to main memory when the cache is written.

Figure 12:
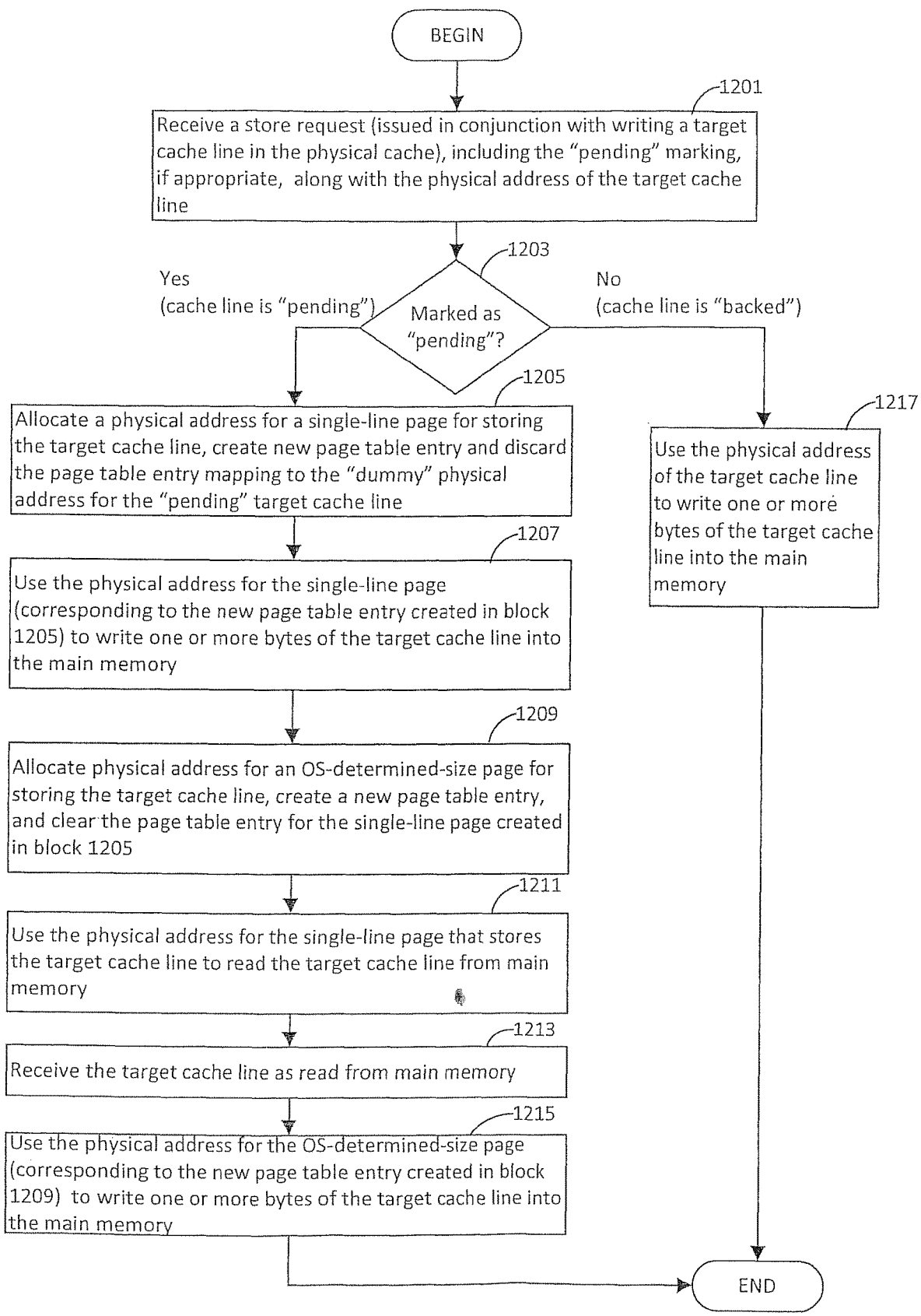
FIG. 12 is a flow chart that illustrates exemplary operations carried out by the memory controller of FIG. 8 in processing a store request where the cache memory employs a write-through scheme.

FIG. 12 is a flow chart that illustrates exemplary operations carried out by the memory controller 119 of FIG. 8 in processing a store request where the cache memory employs a write-through scheme.

The operations begin in block 1201 where the memory controller 119 receives a store request issued from one level of the cache. In the write-through scheme, such operations are performed in parallel with writing the target cache line into the cache. The marking of the target cache line ("pending" or "backed") along with the physical address of the target cache line accompanies (or is associated with) the data of the target cache line in the store request.

In block 1203, the memory controller 119 checks the marking of the target cache line to determine whether it is marked as "pending." If so, the target cache line is "pending" and the operations continue to blocks 1205 to 1215 and then ends. Otherwise, the target cache line is "backed" and the operations continue to block 1217 and then ends.

In block 1205, the memory controller 119 triggers the allocation of a physical address for a single-line page for storing the target cache line, creates new page table entry for this page, and discards the page table entry to the "dummy" physical address previously associated with evicted cache line. It is contemplated that the memory controller 119 can cooperate with the operating system to determine the allocation of the physical address for the single-line page corresponding to the target cache line.

In block 1207, the memory controller 119 utilizes the physical address for the single-line page (corresponding to the new page table entry created in block 1205) to write one or more data bytes of the target cache line into the main memory 101A.

In block 1209, the memory controller 119 triggers allocation of a physical address for an OS-determined-size page for storing the target cache line, creates a new page table entry, and clears the page table entry for the single-line page created in block 1205. It is contemplated that the memory controller 119 can cooperate with the operating system to determine the page size for the target cache line by raising a predefined interrupt signal. The execution of the operating system can consult internal data structures to determine what the target cache line was being used for (such as the stack, heap, I/O buffer, etc.) and decide on the page size on that basis for communication back to the memory controller 119.

In block 1211, the memory controller 119 can utilize the physical address for the single-line page that stores the target cache line to read the target cache line from main memory 101A.

In block 1213, the memory controller 119 can receive the target cache line as read from main memory 101A in block 1211.

In block 1215, the memory controller 119 can utilize the physical address for the OS-determined-size page (corresponding to the new page table entry created in block 1209) to write one or more bytes of the target cache line into the main memory 101A.

In block 1217, the memory controller 119 can utilize the physical address of the target cache line to write one or more data bytes of the target cache line into the main memory 101A.

Note that in the operations of blocks 1205 to 1215, a write-through store request for a cache line marked as "pending" causes the computer processing system to allocate a backed physical page with suitable mapping to the target cache line. The page table entry corresponding to the "pending" target cache line is then updated such that future references to the virtual address of the target cache line will reach the new backed address instead of the old "pending" address. In addition, all cache lines that are located in the pending region that now has backing can be changed to reflect the new physical address. There are two ways to effect the change from pending to physical address for pre-existing cache lines that become backed. In one, all such pre-existing cache lines are expelled from cache to the backing memory at the new physical address. If subsequently brought back to cache they will have the physical address rather than the pending address in cache. In another approach, the corresponding "pending" pre-existing cache lines are left with their "pending" addresses in cache, and the translation mapping is left referring to the pending address. A new pending-to-backed mapping is created reflecting the new allocation. Probes to cache are translated from virtual to pending addresses, while actual access to physical memory translate from the pending address to the backing address. The need for the secondary translation from pending to backed can be detected by the memory controller because the pending address, while it lies within the physical address space, does not correspond to and actual memory location. The memory controller 119 then translates the unbacked pending address to the backed address for the actual access to memory. The pending-to-physical mapping can be kept as part of the TLB and page table of the system if the pending address space is numerically disjoint from the virtual address space, or can be kept in a dedicated side table.

Also note that in the operations of blocks 1205 to 1215, the single-line physical page that stores the target cache line is transient in nature and provide a place to put the target cache line while the operating system is setting up a larger-sized page. Note that the single-line page is similar to the larger-size page in that it is backed. When a larger-sized page has been allocated and initialized it is placed in the page table, the cache line in the one-line page is read in from physical memory and written out to its place in the new larger-sized page, and the table entry for the one-line page is cleared so no virtual address maps to it any more. That one-line page can then queued for the hardware for the next time that a write-through store request for a cache line marked as "pending" is received at the memory controller 119.

In the embodiments described above, the virtual memory of the computer processing system can support several different page sizes, and in particular, pages that are the size of a single cache line. The operating system can be configured to maintain a pool of unused and uninitialized pre-allocated single cache line backing pages, and the computer processing system can include dedicated hardware circuitry or microcode or other suitable mechanism that is configured to allocate such pages and update the page table entries of the system with the allocated address. The eviction of a vacant cache line causes the computer processing system to allocate one from the pool of pages, update the page table entries of the system with the allocated address, and change the page table entry such that is marked as "backed." Eviction can then proceed normally, as if the cache line had been backed already. The computer processing system can utilize an interrupt to invoke the operating system to replenish the pool of free pages when needed. A background task may allocate and initialize a larger page, consolidate the data of the one-line pages into the larger page, adjust the page table entries of the system so that future references to the virtual addresses will be mapped to the larger page, and then finally return the one-line pages to the pool. The hardware may use an interrupt to invoke the operating system to replenish the pool of free pages as needed.

In an alternate embodiment, the operating system can be configured to maintain a pool of unused pre-allocated backing pages that are pre-initialized with zero value data bytes throughout, and the computer processing system can include dedicated hardware circuitry or microcode or other suitable mechanism that is configured to allocate such pages and update page table entries with the allocated address. The eviction of a vacant cache line causes the computer processing system to allocate one from the pool of pages, update the page table entry to the allocated physical address, and change the page table entry such that is marked as "backed." Eviction can then proceed normally, as if the cache line had been backed already. The computer processing system can use an interrupt to invoke the operating system to replenish the pool of free pages as needed.

In the embodiments described herein, the computer processing system can perform load and store operations without previously allocating and initializing the backing memory. All backless cache lines resides in cache, and there is no involvement with the operating system. Furthermore, if a page is discarded where the cache lines for the page resides solely in cache, then physical memory is never used. This can reduce memory traffic between cache and the physical memory of the computer processing system.

Furthermore, many programs are small enough that they fit entirely in cache and transient enough that the operating system constitutes a large fraction of their cost. Consequently, using backless cache lines that are allocated and initialized without operating system involvement can improve performance, power usage, etc. In addition, if such a program is assigned real memory, it is likely that memory will never be used (because everything fits in cache) so it was allocated and initialized pointlessly. In this case, using backless cache lines can lower costs for the program that uses it, and by reducing pressure on physical memory and also lowers costs for programs that don't use backless cache lines.

There have been described and illustrated herein several embodiments of a computer processor and corresponding method of operations. While particular embodiments of the invention have been described, it is not intended that the invention be limited thereto, as it is intended that the invention be as broad in scope as the art will allow and that the specification be read likewise. For example, the microarchitecture and memory organization of the CPU 101 as described herein is for illustrative purposes only. A wide variety of CPU microarchitectures can embody the improvement and methods described herein, including microarchitectures that employ in-order execution, microarchitectures that employ out-of-order execution, superscalar microarchitectures, VLIW microarchitectures, single-core microarchitectures, multi-core microarchitectures, and combinations thereof. In another example, the functionality of the CPU 101 as described herein can be embodied as a processor core and multiple instances of the processor core can be fabricated as part of a single integrated circuit (possibly along with other structures). It will therefore be appreciated by those skilled in the art that yet other modifications could be made to the provided invention without deviating from its spirit and scope as claimed.

What is claimed is:

1. A computer processing system comprising:
a hierarchical memory system having at least one cache and physical memory, wherein the hierarchical memory system is organized as virtual memory with a mapping between virtual addresses and corresponding physical addresses; and
a processor having execution logic that generates memory requests that are supplied to the hierarchical memory system, wherein the memory requests include at least one load memory request supplied to the hierarchical memory system for reading a cache line stored in the hierarchal memory system;
wherein, the hierarchical memory system processes the load memory request by determining whether the load memory request specifies a virtual address that is not allocated to valid physical address space of the physical memory of the hierarchical memory system, generating a backless cache line with zero-value data bytes throughout in response to such determining, returning the backless cache line to the execution logic, and storing the backless cache line in the at least one cache where the backless cache line is associated with a virtual address that lacks allocation to any valid physical address space of the physical memory of the hierarchical memory system; and
wherein, when the backless cache line is evicted From cache of the hierarchical memory system, the hierarchical memory system transforms the backless cache line to a backed state by allocating valid physical address space of the physical memory of the hierarchical memory system and associating the allocated valid physical address space with the virtual address of the backless cache line.

2. A computer processing system according to claim 1, wherein:
a plurality of page table entries represents the mapping between virtual addresses and corresponding physical addresses of the hierarchical memory system, and the backless cache line does not correspond to any page table entry whose physical address points to valid physical address space of the physical memory of the hierarchical memory system.

3. A computer processing system according to claim 2, wherein:
the backless cache line does not have a corresponding page table entry.

4. A computer processing system according to claim 2, wherein:
the backless cache line corresponds to a page table entry whose physical address points outside the valid physical address space of the physical memory of the hierarchical memory system.

5. A computer processing system according to claim 1, wherein:
the transformation of the backless cache line to the backed state involves allocating physical address space of the physical memory of the hierarchical memory system for storing the backless cache line.

6. A computer processing system according to claim 5, wherein:
the physical address space of the physical memory of the hierarchical memory system that is allocated to store the backless cache line comprises a single-cache-line-sized page in the physical address space of the physical memory of the hierarchical memory system.

7. A computer processing system according to claim 6, wherein:
the backless cache line is stored temporarily in the single-cache-line-sized page of the physical memory of the hierarchical memory system and thereafter moved to a larger-sized page of the physical memory of the hierarchical memory system.

8. A computer processing system according to claim 6, wherein:
the larger-size page is specified by execution of an operating system on the computer processing system.

9. A computer processing system according to claim 1, wherein:
the cache of the hierarchical memory system comprises at least one virtual cache.

10. A computer processing system according to claim 1, wherein:
the cache of the hierarchical memory system comprises at least one physical cache.

11. A computer processing system according to claim 10, wherein:
the mapping between virtual addresses and corresponding physical addresses for the backless cache line includes a predefined marking that identifies the backless cache line as being backless.

12. A computer processing system according to claim 11, wherein:
the transformation of the backless cache line to the backed state involves allocating valid physical address space of the physical memory of the hierarchical memory system for storing the backless cache line and updating the marking to reflect the backed state of the cache line.

13. A computer processing system according to claim 11, wherein:
the backless cache line is transformed to a backed state when written to the physical memory of the hierarchical memory system as part of a write-through cache scheme.

14. A computer processing system according to claim 1, wherein:
a respective cache line is initially written to cache of the hierarchical memory system as a backless cache line until transformed to a backed state.

15. A method of managing virtual memory in a computer processing system that includes a hierarchical memory system having at least one cache and physical memory, the method comprising:
maintaining a mapping between virtual addresses and corresponding physical addresses of the hierarchical memory system;
receiving at least one load memory request supplied to the hierarchical memory system for reading a cache line stored in the hierarchal memory system;
processing the load memory request by determining whether the load memory request specifies a virtual address that is not allocated to valid physical address space of the physical memory of the hierarchical memory system, generating and returning a backless cache line with zero-value data bytes throughout in response to such determining, and storing the backless cache line in the at least one cache where the backless cache line is associated with a virtual address that lacks allocation to any valid physical address space of the physical memory of the hierarchical memory system; and
in conjunction with evicting the backless cache line from cache of the hierarchical memory system, transforming the backless cache line to a backed state by allocating valid physical address space of the physical memory of the hierarchical memory system and associating the allocated valid physical address space with the virtual address of the backless cache line.

16. A method according to claim 15, wherein:
a plurality of page table entries represents the mapping between virtual addresses and corresponding physical addresses, and the backless cache line does not correspond to any page table entry whose physical address points to valid physical address space of the physical memory of the hierarchical memory system.

17. A method according to claim 16, wherein:
the backless cache line does not have a corresponding page table entry.

18. A method according to claim 16, wherein:
the backless cache line corresponds to a page table entry whose physical address points outside the valid physical address space of the physical memory of the hierarchical memory system.

19. A method according to claim 16, wherein:
the transformation of the backless cache line to the backed state involves updating the page table entry corresponding to the cache line by replacing a physical address that points outside the valid physical address space of the physical memory of the hierarchical memory system to a valid physical address within the physical address space of the physical memory of the hierarchical memory system.

20. A method according to claim 15, wherein:
the transformation of the backless cache line to the backed state involves allocating physical address space of the physical memory of the hierarchical memory system for storing the backless cache line.

21. A method according to claim 20, wherein:
the physical address space of the physical memory of the hierarchical memory system that is allocated to store the backless cache line comprises a single-cache-line-sized page in the physical address space of the physical memory of the hierarchical memory system.

22. A method according to claim 21, further comprising:
temporarily storing the backless cache line in the single-cache-line-sized page of the physical memory of the hierarchical memory system and thereafter moving such cache line to a larger-sized page of the physical memory of the hierarchical memory system.

23. A method according to claim 22, wherein:
the larger-size page is specified by execution of an operating system on the computer processing system.

24. A method according to claim 15, wherein:
the cache of the hierarchical memory system comprises at least one virtual cache.

25. A method according to claim 15, wherein:
the cache of the hierarchical memory system comprises at least one physical cache.

* * * * *